United States Patent
Shimizu et al.

(10) Patent No.: US 7,748,514 B2
(45) Date of Patent: Jul. 6, 2010

(54) OBJECT LOADING AND UNLOADING CONVEYANCE DEVICE

(75) Inventors: Yoshio Shimizu, Shiga (JP); Yasushi Ishioka, Shiga (JP)

(73) Assignee: Daifuku Co., Ltd. (JP)

( * ) Notice: Subject to any disclaimer, the term of this patent is extended or adjusted under 35 U.S.C. 154(b) by 249 days.

(21) Appl. No.: 11/855,396

(22) Filed: Sep. 14, 2007

(65) Prior Publication Data
US 2008/0075577 A1    Mar. 27, 2008

(30) Foreign Application Priority Data
Sep. 22, 2006   (JP)   ............................. 2006-256596

(51) Int. Cl.
*B65G 37/00* (2006.01)
(52) U.S. Cl. .................................. 198/346.1; 198/793
(58) Field of Classification Search ................ 198/801, 198/346.1, 345.1, 345.2, 345.3, 347.1, 347.2, 198/463.1, 463.2, 463.3, 465.1, 429, 678.1, 198/680, 681, 682, 683, 684, 687.1, 717, 198/720, 736, 747, 793, 794, 797, 798, 799, 198/800, 469.1
See application file for complete search history.

(56) References Cited

U.S. PATENT DOCUMENTS

| | | | | |
|---|---|---|---|---|
| 3,228,540 A * | 1/1966 | Crile et al. | ................... | 414/283 |
| 3,882,792 A * | 5/1975 | McIntier | ................... | 104/162 |
| 3,921,828 A * | 11/1975 | Suizu | ................... | 414/280 |
| 4,248,563 A * | 2/1981 | Fur | ................... | 414/280 |
| 4,277,217 A * | 7/1981 | Miller et al. | ................... | 414/395 |
| 4,389,157 A * | 6/1983 | Bernard et al. | ................... | 414/787 |
| 4,398,630 A * | 8/1983 | Brems | ................... | 198/465.1 |
| 4,465,177 A * | 8/1984 | Dorner | ................... | 198/475.1 |
| 4,483,476 A * | 11/1984 | Fujikawa et al. | ................... | 228/4.1 |
| 4,543,026 A * | 9/1985 | Halonen et al. | ................... | 414/352 |
| 4,589,184 A * | 5/1986 | Asano et al. | ................... | 29/430 |
| 4,609,093 A * | 9/1986 | Taketani et al. | ................... | 198/378 |
| 4,659,895 A * | 4/1987 | Di Rosa | ................... | 219/79 |
| 4,736,515 A * | 4/1988 | Catena | ................... | 29/714 |
| 4,800,249 A * | 1/1989 | Di Rosa | ................... | 219/79 |
| 4,911,281 A * | 3/1990 | Jenkner | ................... | 198/364 |
| 5,106,259 A * | 4/1992 | Anderson et al. | ................... | 414/807 |
| 5,123,161 A * | 6/1992 | Kubo et al. | ................... | 29/784 |

(Continued)

FOREIGN PATENT DOCUMENTS

JP            05000685  A  *  1/1993

*Primary Examiner*—Gene Crawford
*Assistant Examiner*—William R Harp
(74) *Attorney, Agent, or Firm*—St. Onge Steward Johnston & Reens LLC

(57) ABSTRACT

A conveyance device suitable for an automobile assembling plant has an object loading and unloading conveyance device between a hanging conveyance line, in which a pallet supporting a door is conveyed while being supported by a hanging hanger, and an object loading and unloading position on the floor side. The conveyance device also has a pallet transferring position set above the object loading and unloading position, a horizontal conveyance device, which conveys a pallet between the pallet transferring position and a hanger stop position, and an elevating conveyance device which conveys the pallet vertically between the object loading and unloading position and the pallet transferring position. The elevating conveyance device rotates a plurality of pallet mounting bases in an endless cyclic elevating path while holding these in erect postures, and the pallet mounting bases are arranged at even intervals equal to the distance between the upper and lower positions.

20 Claims, 14 Drawing Sheets

U.S. PATENT DOCUMENTS 5,285,909 A * 2/1994 Slater ......................... 211/151
5,577,597 A * 11/1996 Kakida et al. ............ 198/465.1
5,593,269 A * 1/1997 Bernard, II ............ 414/331.04

* cited by examiner

OBJECT LOADING AND UNLOADING CONVEYANCE DEVICE

FIELD OF THE INVENTION

The present invention relates to a conveyance device for conveying an object between an overhead hanging conveyance line and an object loading and unloading position on the floor side, and a conveyance method using this conveyance device.

BACKGROUND OF THE INVENTION

For example, in a production line of automobiles, there is a case where, to an unpainted vehicle body conveyed by a supporting conveyance line on the floor side constituted by a floor conveyor such as a carriage type conveyor or a slat conveyor, an unpainted door conveyed while being supported by a hanger in a hanging conveyance line constituted by an overhead type trolley conveyor or the like, etc., is assembled, and conveyed to a painting line, and a case where, to remove a door from a painted door-attached vehicle body and convey the vehicle body and the door to mutually different lines, a door removed from a door-attached vehicle body conveyed by the supporting conveyance line is loaded onto the hanging conveyance line and conveyed. As an object loading and unloading conveyance device to be used in such cases, for example, as described in Japanese Patent Publication No. 2890216 (Japanese Unexamined Patent Publication No. H05-685), there is known an object loading and unloading conveyance device which includes a hanging conveyance line in which a pallet which supports an object (door) is supported and conveyed by a hanger and a supporting conveyance line in which an object (vehicle body) is supported and conveyed below the hanging conveyance line, and conveys the pallet between a hanger stop position of the hanging conveyance line and an object loading and unloading position lateral to the supporting conveyance line, comprised of a horizontal conveyance device which conveys the pallet substantially horizontally between a pallet transferring position set above the object loading and unloading position and a hanger stop position in the hanging conveyance line, and an elevating conveyance device which conveys the pallet vertically between the object loading and unloading position and the pallet transferring position.

However, the conventional conveyance device as described in the aforementioned patent publication, etc., uses an elevating conveyance device of a type called a drop lifter comprising one pallet mounting base that reciprocates on one side of elevating guide rails so as to move linearly vertically. Therefore, to assemble a door conveyed by the overhead hanging conveyance line to a vehicle body to be conveyed by the supporting conveyance line on the floor side, an operator manually extracts the door from a door mounting pallet sent to an object loading and unloading position by the side of the supporting conveyance line on the floor side, and thereafter, a subsequent door mounting pallet must be made to wait in the hanging conveyance line unless the empty pallet is returned to the hanger of the hanging conveyance line from which the door mounting pallet was unloaded and is waiting in the empty state by the elevating conveyance device and the horizontal conveyance device. That is, one cycle time during which a door mounting pallet is put down from the hanger conveyed to a predetermined position (hanger stop position) by the hanging conveyance line, to a predetermined position (object loading and unloading position) and the door is extracted from the hanger, and the empty pallet is returned to the original hanger of the hanging conveyance line that is stopped and waits, and a subsequent door mounting pallet is sent to a predetermined position (hanger stop position), becomes very long, and no matter how quickly an operator performs the work of assembling the door extracted from the door mounting pallet to a vehicle body on the supporting conveyance line on the floor side, the working efficiency of the whole conveyance device cannot be improved.

SUMMARY OF THE INVENTION

An object of the invention is to provide an object loading and unloading conveyance device which can solve the conventional problem described above. According to the invention, object loading and unloading conveyance device is located between a hanging conveyance line (trolley conveyor line 1) in which a pallet which supports an object (door D of a vehicle) is supported and conveyed by a hanging hanger 3, and an object loading and unloading position P3 set on the floor side for loading and unloading the object from the pallet P. The object loading and unloading conveyance device comprises a horizontal conveyance device 6 which conveys the pallet P substantially horizontally between a pallet transferring position P2 set above the object loading and unloading position and a hanger stop position P1 in the hanging conveyance line (trolley conveyor line 1), and an elevating conveyance device 7 which conveys the pallet P vertically between the object loading and unloading position P3 and the pallet transferring position P2, wherein the elevating conveyance device 7 is composed of a plurality of pallet mounting bases 10A through 10C for supporting the pallet P, an endless cyclic elevating path 11 which cyclically moves vertically the pallet mounting bases 10A through 10C, and a drive means 12 which rotatively moves the respective pallet mounting bases 10A through 10C while holding these in erect postures in the endless cyclic elevating path 11, and the pallet mounting bases 10A through 10C are arranged at even intervals equal to the distance between the object loading and unloading position P3 and the pallet transferring position P2.

The elevating conveyance device which conveys an object-mounting pallet vertically between the pallet transferring position between the same and the horizontal conveyance device and the object loading and unloading position on the floor side below the pallet transferring position rotatively moves vertically the plurality of pallet mounting bases supporting the pallet in the endless cyclic elevating path, and the pallet mounting bases are arranged at even intervals equal to the distance between the object loading and unloading position and the pallet transferring position above the object loading and unloading position, so that it is possible to easily carry out a conveyance method according to the invention.

A conveyance method of the invention comprises conveying an object (vehicle door D) to the object loading and unloading position P3 on the floor side from the hanging conveyance line 1, wherein by an operation of the elevating conveyance device 7 when transferring an occupied pallet P on which an object is mounted and put down from the hanger 3 of the hanging conveyance line 1 from the horizontal conveyance device 6 to the elevating conveyance device 7 and conveying it to the object loading and unloading position P3, an empty pallet P from which an object was unloaded previously at the object loading and unloading position P3 is simultaneously conveyed to the pallet transferring position P2, and this empty pallet P is transferred from the elevating conveyance device 7 to the horizontal conveyance device 6, and loaded onto an empty hanger 3 of the hanging conveyance line 1 in which the occupied pallet P was unloaded from and is waiting.

The conveyance method of the invention also comprises conveying an object (vehicle door D) from the object loading and unloading position P3 on the floor side to the hanging conveyance line 1, wherein by an operation of the elevating conveyance device 7 when transferring an empty pallet P put down from the hanger 3 of the hanging conveyance line 1 from the horizontal conveyance device 6 to the elevating conveyance device 7 and conveying it to the object loading and unloading position P3, an occupied pallet P on which an object was mounted previously at the object loading and unloading position P3 is simultaneously conveyed to the pallet transferring position P2 and this occupied pallet P is transferred from the elevating conveyance device 7 to the horizontal conveyance device 6 and loaded onto the hanger 3 of the hanging conveyance line 1 in which the empty pallet was unloaded from and is waiting.

That is, as well as lowering of the object-mounted pallet to the object loading and unloading position from the pallet transferring position, an empty pallet which an object was previously extracted from and was left empty in the elevating conveyance device can be conveyed to the pallet transferring position, so that from the time of arrival of the object-mounted pallet to the object loading and unloading position, by the horizontal conveyance device, the pallet that became empty previously can be loaded onto the empty pallet which the object mounted pallet was unloaded from and is waiting at the hanger stop position. In other words, the time to return an empty pallet from which the object was extracted at the object loading and unloading position to the pallet transferring position by the elevating conveyance device becomes unnecessary.

Therefore, one cycle time during which the object-mounted pallet is put down from the hanger conveyed to the hanger stop position by the hanging conveyance line to the object loading and unloading position on the floor side and the object is extracted, and the pallet that became empty is returned to the original hanger of the hanging conveyance line that is stopped and waits, and a subsequent door-mounted pallet is sent to the hanger stop position can be significantly shortened, and the working efficiency of the whole conveyance device can be improved. Of course, even when an object is conveyed from the object loading and unloading position on the floor side to the hanging conveyance line by using a pallet supplied from the hanging conveyance line in a manner reverse to the above-described manner, it is possible that the object is loaded onto an empty pallet conveyed to the object loading and unloading position by the elevating conveyance device, and when this is conveyed and elevated to the pallet transferring position, an empty pallet which was previously put down from the hanger of the hanging conveyance line and carried into the elevating conveyance device at the pallet transferring position by the horizontal conveyance device can be conveyed and lowered to an object loading and unloading position on the floor side, so that one cycle time in this work can be significantly shortened and the working efficiency of the whole conveyance device can be improved.

The number of pallet mounting bases 10A through 10C provided in the cyclic elevating path of the elevating conveyance device 7 can be three.

The number of pallet mounting bases in the elevating conveyance device can be a minimum of three, so that not only can the cost of the whole conveyance device be reduced but also the useless holding time of the object and the empty pallet in the elevating conveyance device can be minimized.

On each of the pallet mounting bases 10A through 10C, a pair of roller rails 54a and 54b which support left and right sides of the pallet P movably horizontally can be provided. The pallet P is structured so as to comprise a pair of left and right side frames 85, a joint member 86 which joins the side frames 85 to each other, and a pair of left and right projecting plates 87 projecting outward from the upper sides of the left and right side frames 85, and the pair of left and right projecting plates 87 are supported by the pair of left and right roller rails 54a and 54b.

Transferring of the pallet onto the pallet mounting base of the elevating conveyance device at the pallet transferring position can be performed only by a simple horizontal sliding operation without requiring elevating and lowering operations of the pallet, so that the horizontal conveyance device becomes simple in construction. While the pallet structure is made simple to reduce the cost, the pair of left and right side frames on the pallet side fit between the pair of left and right roller rails of the pallet mounting base on the elevating conveyance device side, so that there is no possibility that the position in the left-to-right horizontal direction of the pallet to be transferred greatly changes, so that the pallet can be safely transferred.

Further, the horizontal conveyance device 6 can be provided with pallet mounting base positioning means 74 which can engage with and disengage from engaged portions 73 of the pallet mounting bases 10A through 10C stopping at the pallet transferring position P, and can hold the pallet mounting bases 10A through 10C at a fixed stop level by engaging with the engaged portions 73. The horizontal conveyance device 6 is provided with stoppers (stopper pins 78) for preventing dropping of the pallet to the pallet transferring position P2 side from the position on the horizontal conveyance device 6, the stoppers (stopper pins 78) are urged and held at stopping positions, and the pallet mounting base positioning means 74 is provided with a movable rod-like body 76 which has, on its tip end, a fitting portion 76a that can engage with and disengage from the engaged portion 73, and is movable in directions of moving away from and approaching the engaged portion 73, and a lever 80 which is operated by the movable rod-like body 76 when this movable rod-like body 76 advances is provided on the stopper (stopper pin 78), and when the movable rod-like bodies 76 advance and the fitting portions 76a on the tip ends fit the engaged portions 73, the stoppers (stopper pins 78) are switched to stop-releasing positions via the levers 80.

When transferring the pallet between the horizontal conveyance device and the pallet mounting base of the elevating conveyance device, the position of this pallet mounting base can be fixed at a predetermined level, so that the pallet transferring operation can be safely and reliably performed. When the horizontal conveyance device and the pallet mounting base of the elevating conveyance device are not connected, the pallet can be prevented from unexpectedly dropping from the horizontal conveyance device to the elevating conveyance device side, and an exclusive actuator and controller for releasing the stopper are unnecessary, so that the device cost can be reduced.

The hanging hanger 3 of the hanging conveyance line 1 is structured to comprise a pallet fitting support 18 which supports the pallet P so as to fit and separate vertically, and the horizontal conveyance device 6 can include a pallet loading and unloading conveyor 8 which loads and unloads the pallet P1 onto and from the hanger according to elevating and lowering movement with respect to the hanger 3 stopping at the hanger stop position P, and a pallet transferring means 9 which transfers the pallet P between the pallet loading and unloading conveyor 8 and the pallet mounting bases 10A through 10C stopping at the pallet transferring position P2.

When employing the construction, it is not necessary to use a large-sized conveyor having a long conveyance path reaching the pallet transferring position as the pallet loading and unloading conveyor required to perform elevating operations, so that The present invention can be easily carried out.

When employing the construction, the pallet transferring means 9 of the horizontal conveyance device includes a pallet carrying conveyor 24, a first movable body 25a, and a second movable body 27a, wherein the pallet carrying conveyor 24 is connected to the pallet loading and unloading conveyor 8 above the hanger 3 stopping at the hanger stop position P1, the first movable body 25a moves to reciprocate in the pallet conveying direction, and on the first movable body 25a, a pallet pushing-out engagement piece 26a is provided which propels the pallet P onto the pallet mounting bases 10A through 10C stopping at the pallet transferring position P2 from the pallet carrying conveyor 24, and the second movable body 27a is constructed to move to reciprocate in the pallet conveying direction, and on the second movable body 27a, a pallet drawing-in engagement piece 28a can be provided which propels the pallet from the position on the pallet mounting bases 10A through 10C stopping at the pallet transferring position P2 onto the pallet carrying conveyor 24.

Further, on the pallet mounting base of 10A through 10C, a pallet latching means 57 which automatically engages with the pallet P transferred onto the corresponding pallet mounting bases 10A through 10C by the pallet pushing-out engagement piece 26a to prevent the pallet P from retreating, and on the second movable body 27a, an operating portion 61 can be provided which switches the pallet latching means 57 into an unlatching posture according to advancing thereof to the side of the pallet mounting base 10A through 10C.

The pallet transferring means to be combined with the pallet loading and unloading conveyor can load or unload the pallet onto and from the pallet mounting base on the elevating conveyance device side by pushing or pulling it horizontally, so that the conveyance method of the invention can be easily carried out. Further, when the pallet is returned to the horizontal conveyance device from the pallet mounting base although the pallet mounted on the pallet mounting base of the elevating conveyance device can be safely conveyed vertically by being fixed to the pallet mounting base, the operation and an exclusive actuator for releasing the pallet fixation become unnecessary.

When employing the construction, the pallet carrying conveyor 24 of the pallet transferring means 9 is provided with stoppers 32 for preventing dropping of the pallet to the pallet loading and unloading conveyor 8 side from the position on this conveyor 24, and the stoppers 32 are urged and held at stopping positions, and the pallet loading and unloading conveyor 8 can be provided with operating portions 35 which switch the stoppers 32 to the releasing positions against the urging forces when the pallet loading and unloading conveyor rises to a position above the hanger 3 stopping at the hanger stop position P1 and is connected to the pallet carrying conveyor 24.

When the pallet carrying conveyor composed of the pallet transferring means of the horizontal conveyance device is not connected to the pallet loading and unloading conveyor, the pallet can be prevented from dropping to the pallet loading and unloading conveyor side from the pallet carrying conveyor, however, an exclusive actuator and controller for switching the stopper to the releasing position when the pallet loading and unloading conveyor and the pallet carrying conveyor are connected, and therefore, the device cost can be reduced.

BRIEF DESCRIPTION OF THE DRAWINGS

For a complete understanding of the above and other features of the invention, reference shall be made to the following detailed description of the preferred embodiments of the invention and to the accompanying drawings; wherein.

PREFERRED EMBODIMENT OF THE INVENTION

Figure 1:
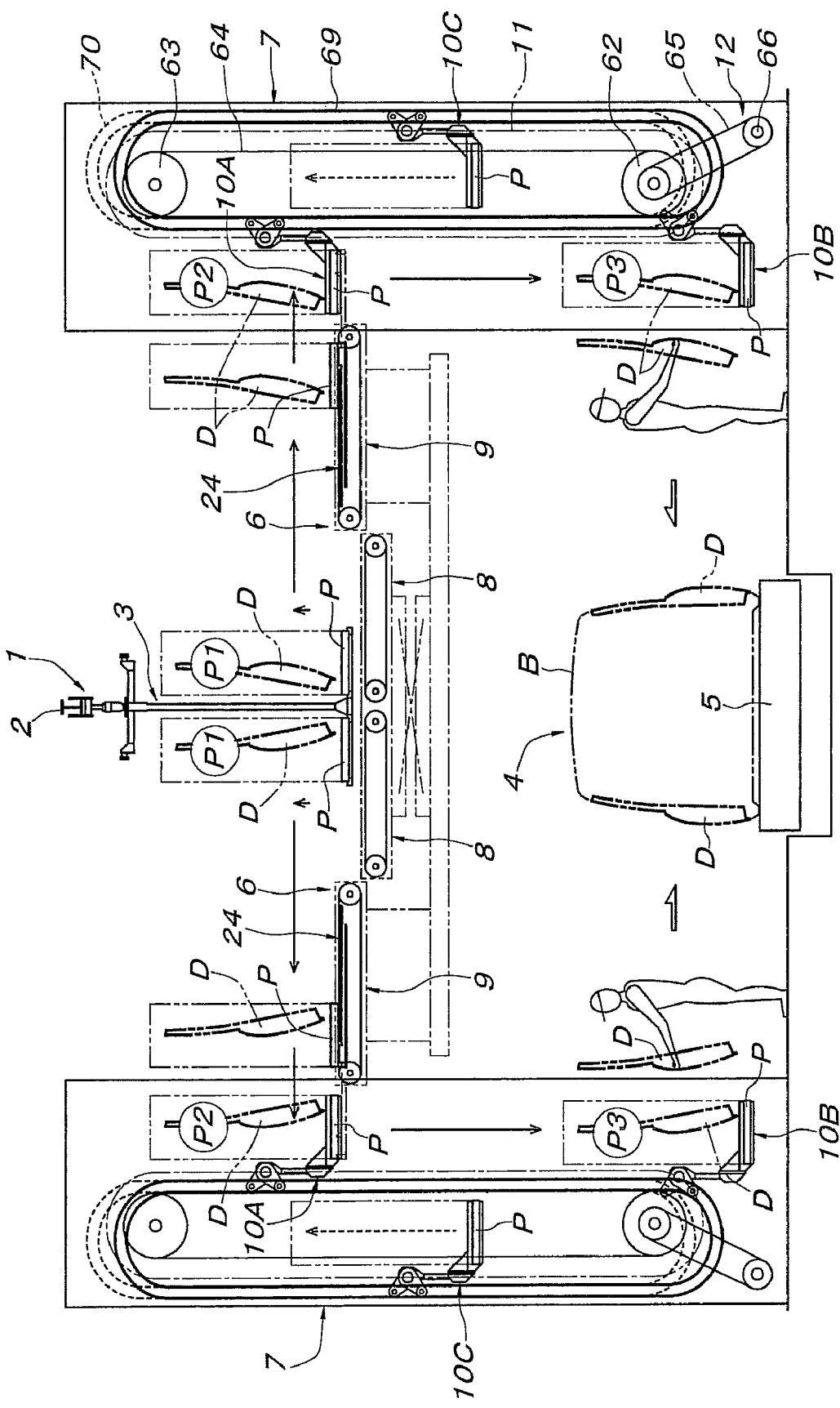
FIG. 1 is a schematic front view showing the entirety of device.

A detailed embodiment described hereinafter is application of an object loading and unloading conveyance device of the invention to the device which conveys a door (object) that was conveyed while hung down to the side of a vehicle body on the floor conveyor side in a part of assembling the door to the vehicle body in an automobile assembly line. In FIG. 1, the reference numeral 1 denotes an overhead type trolley conveyor line. This trolley conveyor line 1 is conventionally known which has a hanger 3 suspended from a trolley of a trolley conveyor that moves along a guide rail 2 laid at an appropriate height overhead, and can automatically stop the hanger 3 at a hanger stop position P1 set on the trolley conveyor line 1, and a pallet P on which a vehicle door D is mounted as an object is conveyed while being supported by the hanger 3. The reference numeral 4 denotes a floor conveyor line just below the trolley conveyor line 1 which is a conventionally known type using a carriage 5 that travels along a conveyance line, and conveys a vehicle body B as an object at a constant speed while mounting it on the carriage 5. A pallet transferring position P2 is set at a position lateral to the hanger stop position P1 in the trolley conveyor line 1, and on the floor side just below the pallet transferring position P2, a door loading and unloading position P3 is set.

Between the pallet stop position P1 and the pallet transferring position P2, a horizontal conveyance device 6 which conveys a pallet P horizontally between the positions P1 and P2 is provided, and between the pallet transferring position P2 and the door loading and unloading position P3, an elevating conveyance device 7 which conveys vertically the pallet P between the positions P2 and P3 is provided. In FIG. 1, as conventionally known in the object loading and unloading conveyance device of this type, the pallet stop position P1, the pallet transferring position P2, and the door loading and unloading position P3 are set symmetrically on both left and right sides of the trolley conveyor line 1 and the carriage type floor conveyor line 4, and therefore, the horizontal conveyance device 6 and the elevating conveyance device 7 are also provided symmetrically on both left and right sides of the trolley conveyor line 1 and the carriage type floor conveyor line 4, and these horizontal conveyance devices 6 and the elevating conveyance devices 7 having the same composition are the same in action and usage, so that the following description is given based on the horizontal conveyance device 6 and the elevating conveyance device 7 on one side.

The horizontal conveyance device 6 is composed of a pallet P loading and unloading conveyor 8 which loads and unloads a pallet P onto and from a hanger 3 stopping at the hanger stop position P1 by moving vertically with respect to this hanger 3, and a pallet transferring means 9 which transfers the pallet P between this pallet loading and unloading conveyor 8 and the pallet transferring position P2. The elevating conveyance device 7 includes three pallet mounting bases 10A through 10C, an endless cyclic elevating path 11 of these pallet mounting bases 10A through 10C, and a drive means 12 which rotatively moves the respective pallet mounting bases 10A through 10C in the endless cyclic elevating path 11 while holding these in erect postures, and the pallet mounting bases 10A through 10C are arranged at even intervals equal to the distance between the door loading and unloading position P3 and the pallet transferring position P2 above the door loading and unloading position.

Figure 2:
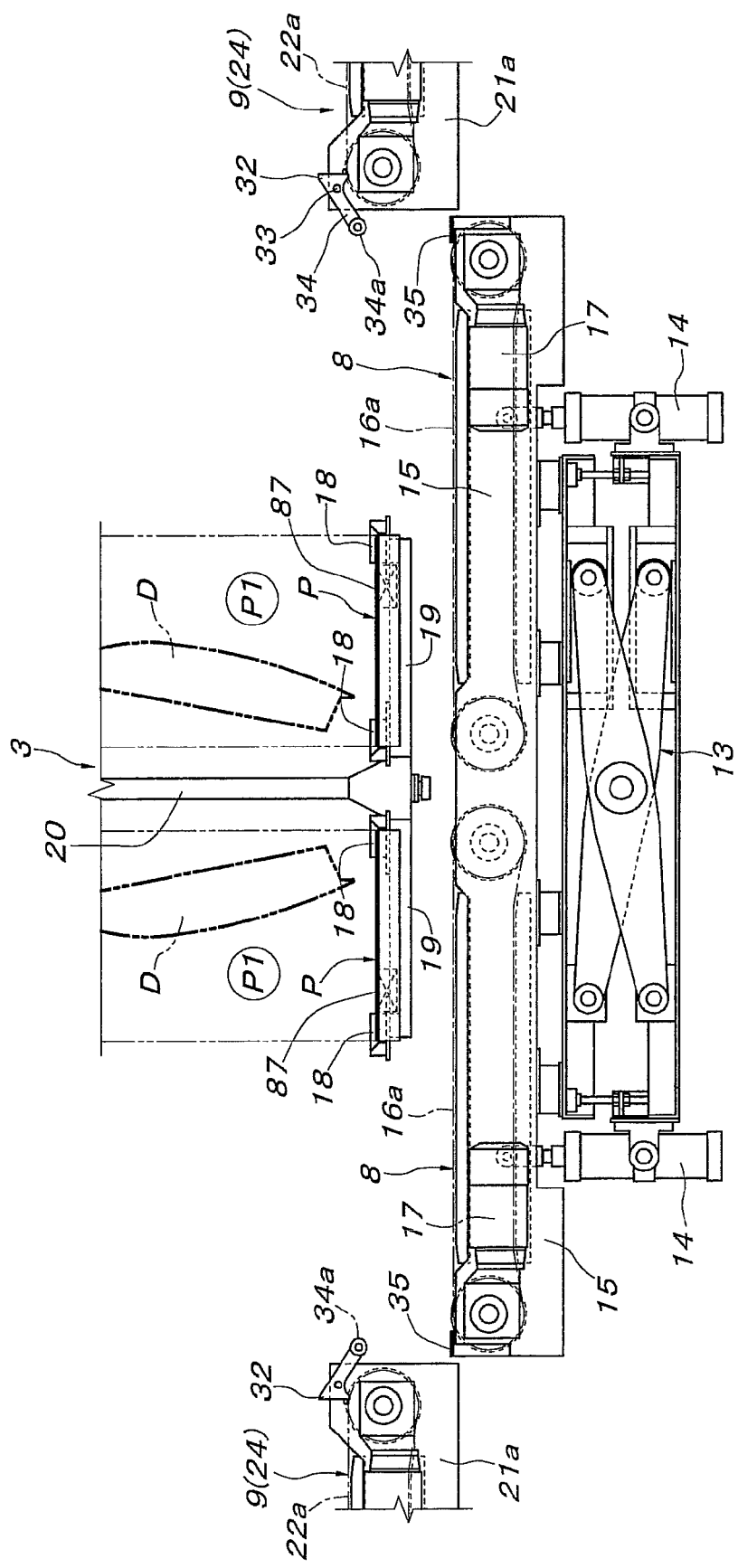
FIG. 2 is a front view showing a state immediately before transferring an object from a hanging conveyance line to a horizontal conveyance device.
Figure 3:
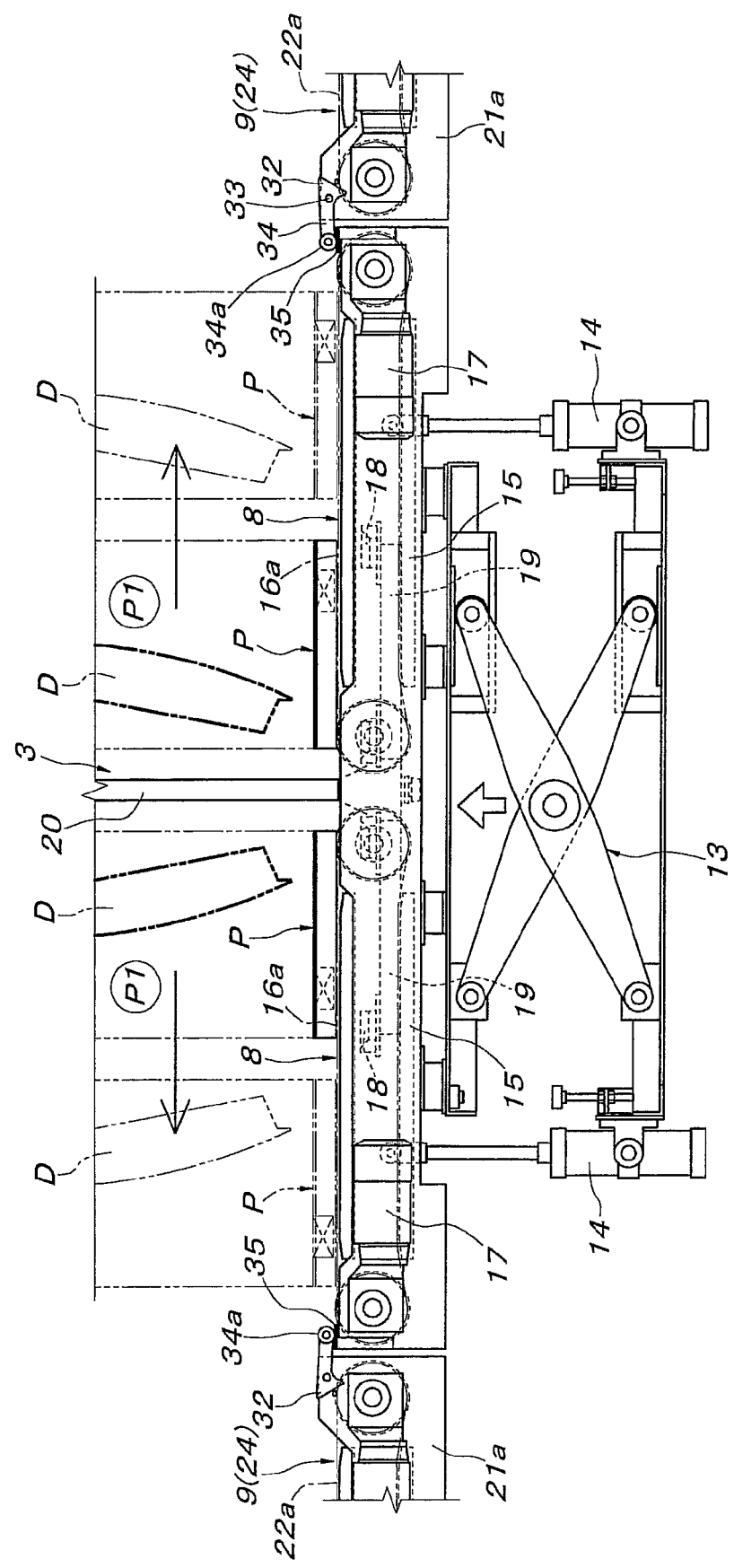
FIG. 3 is a front view showing a state immediately after transferring an object from a hanging conveyance line to a horizontal conveyance device.
Figure 4:
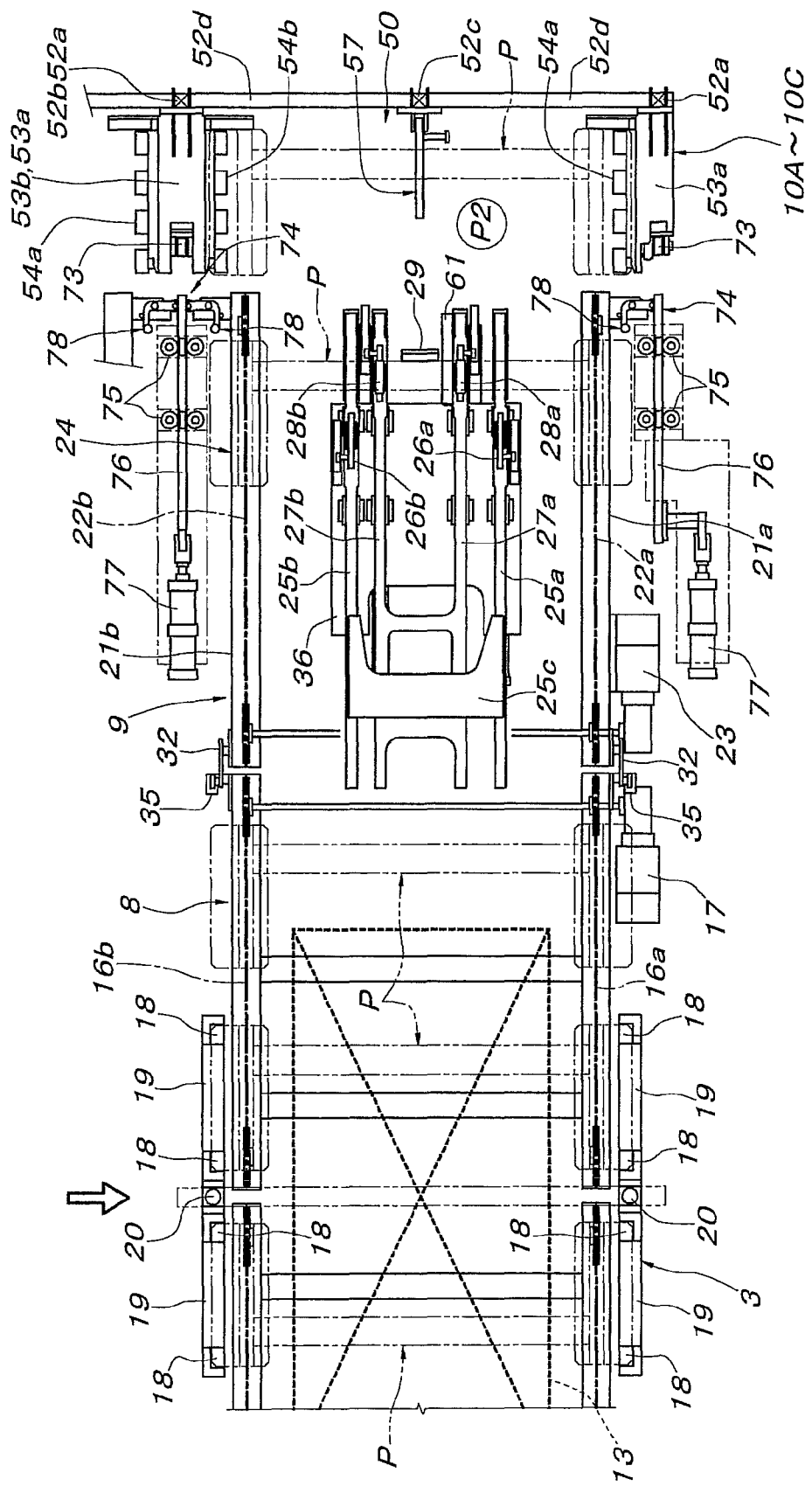
FIG. 4 is a plan view showing the entirety of the horizontal conveyance device.
Figure 5:
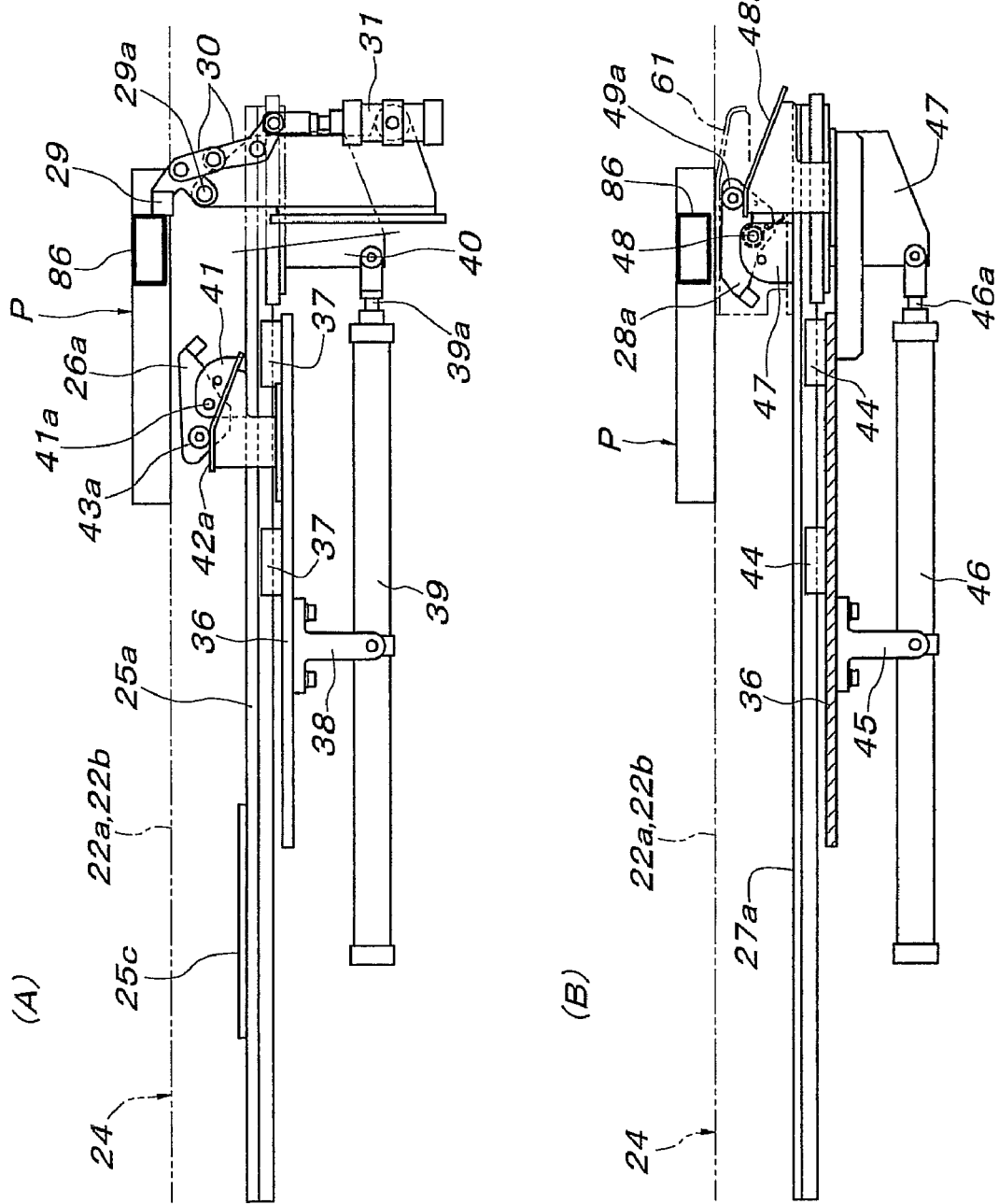
FIG. 5A is a partially longitudinal sectional side view showing a state in which a pallet is conveyed to a predetermined position of a pallet transferring means of the horizontal conveyance device.
FIG. 5B is a longitudinal sectional view showing a state of a pallet drawing-in engagement piece at this time.

As shown in FIG. 2 through FIG. 4, the pallet loading and unloading conveyor 8 of the horizontal conveyance device 6 is constructed so that roller chains 16a and 16b are wound around a pair of left and right elevating frames 15, respectively, which are supported so as to move vertically in parallel by a pantograph mechanism 13 and driven to move vertically by elevating drive cylinder units 14a and 14b, and a motor 17 which drives and rotates the pair of left and right roller chains 16a and 16b forward and reverse is also provided, and in a state in which the pallet loading and unloading conveyor is lowered to a lower level shown in FIG. 2, the hanger 3 of the trolley conveyor line 1 can pass above the pallet loading and unloading conveyor 8, and by raising this pallet loading and unloading conveyor 8 to an upper level shown in FIG. 3 while the hanger 3 stops at the hanger stop position P1, the pallet P supported on the hanger 3 is lifted to a predetermined height from the hanger 3 by the rear half portions of the pair of left and right roller chains 16a and 16b of the pallet loading and unloading conveyor 8.

The hanger 3 is constructed as shown in FIG. 2 and FIG. 4 so that a pair of left and right support arms 19 each having a pallet fitting support 18 that supports the pallet P so as to fit and separate vertically are provided continuously and cantilevered on the lower ends of a pair of front and rear column supports 20 so as to project horizontally sideward, and by fitting the four corners of the pallet P to the respective pallet fitting supports 18 of the pair of left and right support arms 19, this pallet P can be stably supported so as not to move horizontally. Then, when the pallet loading and unloading conveyor 8 rises to the upper level shown in FIG. 3, the pair of left and right elevating frames 15 and the roller chains 16a and 16b rise between the pair of left and right support arms 19 and the column supports 20 to separate the pallet P upward from the pallet fitting supports 18.

The pallet transferring means 9 of the horizontal conveyance device 6 is composed of, as shown in FIG. 4 through FIG. 8, a pallet carrying conveyor 24, a pair of left and right first movable bodies 25a and 25b, and a pair of left and right second movable bodies 27a and 27b. The pallet carrying conveyor 24 is provided so as to be connected at the same level to the pair of left and right roller chains 16a and 16b of the pallet loading and unloading conveyor 8 that rose to the upper level shown in FIG. 3, and include roller chains 22a and 22b wound around a pair of left and right side frames 21a and 21b and a motor 23 which drives and rotates the roller chains forward and reverse. The pair of left and right first movable bodies 25a and 25b reciprocate in the pallet conveying direction, and include pallet pushing-out engagement pieces 26a and 26b that propel the pallet P onto the pallet mounting bases 10A through 10C stopping at the pallet transferring position P2 from the pallet carrying conveyor 24. The pair of left and right second movable bodies 27a and 27b reciprocate in the pallet conveying direction, and include pallet drawing-in engagement pieces 28a and 28b which propel the pallet from the pallet mounting bases 10A through 10C stopping at the pallet transferring position P2 onto the pallet carrying conveyor 24.

In greater detail, near the end on the pallet transferring position P2 side of the pallet carrying conveyor 24, a first stopper 29 which receives a pallet P conveyed to the pallet transferring position P2 side at a predetermined position is pivotally supported by a pivot 29a so as to rise and fall, and a cylinder unit 31 which switches this first stopper 29 between a stopping position shown in FIG. 5A and a stop-releasing position shown in FIG. 6B via a link mechanism 30 is also provided. At the end on the pallet loading and unloading conveyor 8 side of the pallet carrying conveyor 24, a pair of left and right second stoppers 32 for preventing dropping of the pallet P to the pallet loading and unloading conveyor 8 side are pivotally supported on the ends of side frames 21a and 21b of the pallet carrying conveyor 24 by pivots 33 as shown in FIG. 2. The second stoppers 32 are urged and held at the stopping positions (see FIG. 2) for receiving the pallet P by gravity acting on operated levers 34 that are extended to the pallet loading and unloading conveyor 8 side and has horizontal shaft rollers 34a on free ends, and as shown in FIG.

3, when the pallet loading and unloading conveyor 8 rises to the upper level, the operated levers 34 are pushed tip via the horizontal shaft rollers 34a by the horizontal plate-shaped operating portions 35 provided on the upper sides of the ends of the pair of left and right elevating frames 15 of the pallet loading and unloading conveyor 8, and as a result, the second stoppers 32 are switched to the stop-releasing positions at which the second stoppers allow the pallet P passes through.

The first movable bodies 25a and 25b uniformly connected by a joint plate 25c are supported movably horizontally back and force in the pallet conveying direction by slide guides 37 provided on a fixed substrate 36, and to a lower side of the tip end (end on the pallet transferring position P2 side) of one movable body 25a, a bearing member 40 is attached, and to this bearing member 40, the tip end of a piston rod 39a of a cylinder unit 39 supported on a lower side of the fixed substrate 36 via a bearing member 38 is joined. By advancing and retreating the piston rod 39a, the first movable bodies 25a and 25b reciprocate horizontally between a retreating limit position shown in FIG. 4, FIG. 5A, and FIG. 7A and an advancing limit position shown in FIG. 6. The pallet pushing-out engagement pieces 26a and 26b are pivotally supported on the bearing members 41 provided projectedly above the first movable bodies 25a and 25b at positions slightly ahead of the tip ends of the first movable bodies 25a and 25b by pivots 41a so as to rise and fall, and are held in rising working postures shown in FIG. 6B by urging forces of twist springs. When the first movable bodies 25a and 25b retreat to the retreating limit position, cam rails 42a and 42b projectedly provided on the fixed substrate 36 switch these pallet pushing-out engagement pieces 26a and 26b into the fall-down postures shown in FIG. 5A via the cam follower rollers 43a and 43b pivotally supported on the respective pallet pushing-out engagement pieces 26a and 26b so that the pallet P can pass through above the pallet pushing-out engagement pieces 26a and 26b.

The second movable bodies 27a and 27b are joined integrally to each other by a joint plate 27c, and supported movably horizontally back and force in the pallet conveying direction by slide guides 44 provided on the fixed substrate 36, and to a lower side of the tip end (end on the pallet transferring position P2 side) of one movable body 27b, a bearing member 47 is attached, and to this bearing member 40, the tip end of a piston rod 46a of the cylinder unit 46 supported on the lower side of the fixed substrate 36 via a bearing member 45 is joined. By advancing and retreating the piston rod 46a, the second movable bodies 27a and 27b reciprocate horizontally between the retreating limit position shown in FIG. 4, FIG. 5B, and FIG. 6A and the advancing limit position shown in FIG. 7. The pallet drawing-in engagement pieces 28a and 28b are pivotally supported so as to rise and fall by pivots 47a onto bearing members 47 projectedly provided on upper sides of the tip ends of the second movable bodies 27a and 27b, and are held in rising working postures shown in FIG. 7B by urging forces of twist springs. Then, when the second movable bodies 27a and 27b retreat to the retreating limit position, the cam rails 48a and 48b provided continuously from the fixed substrate 36 switch the pallet drawing-in engagement pieces 28a and 28b into the fall-down postures shown in FIG. 5B via cam follower rollers 49a and 49b pivotally supported on the respective pallet drawing-in engagement pieces 28a and 28b so that the pallet P can pass above the pallet drawing-in engagement pieces 28a and 28b.

Figure 12:
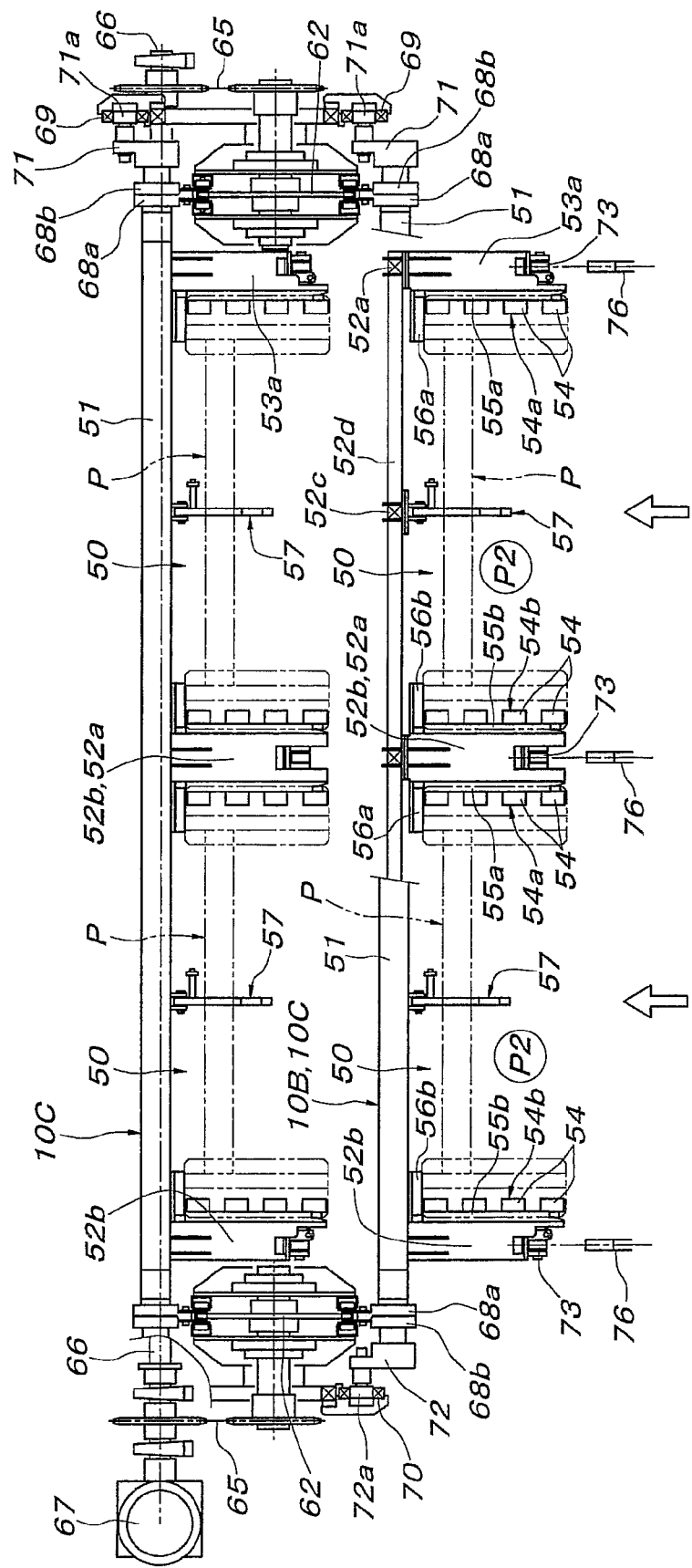
FIG. 12 is a cross-sectional plan view of the elevating conveyance device.
Figure 13:
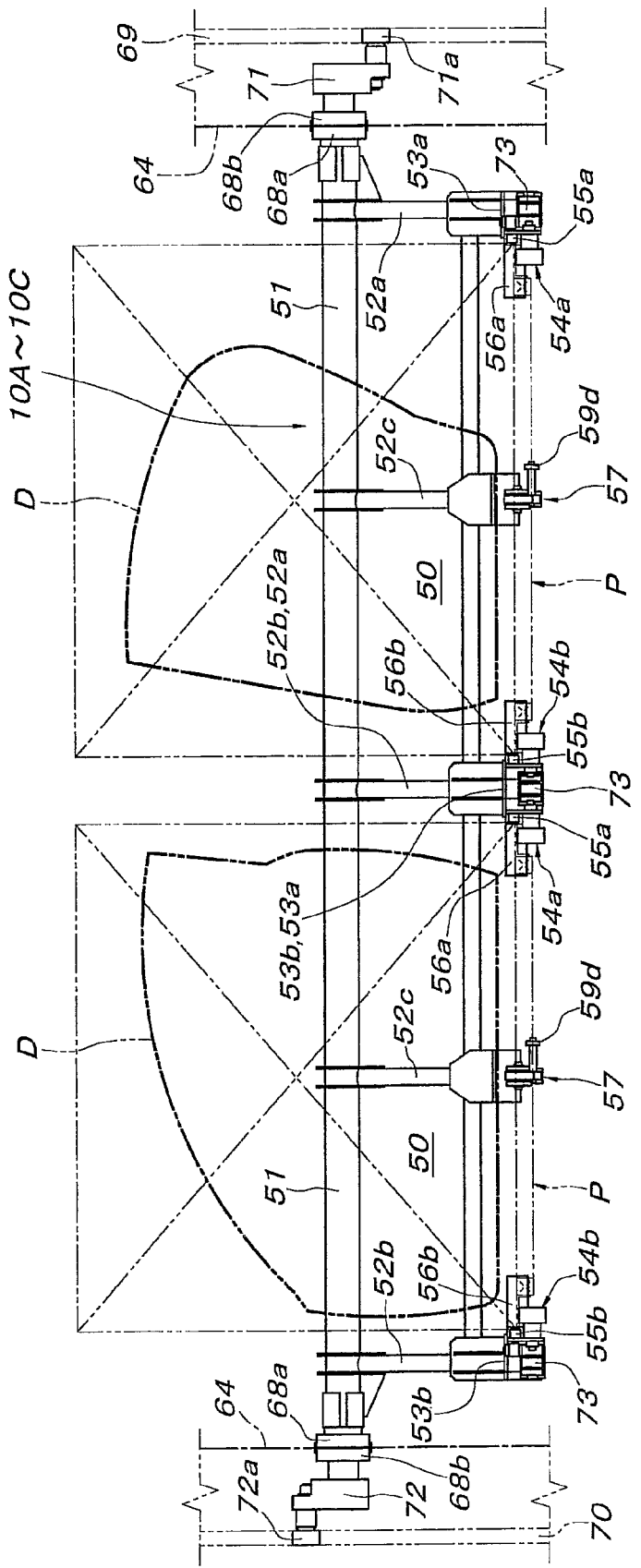
FIG. 13 is a front view showing the pallet mounting base of the elevating conveyance device.

In the accompanying drawings, the horizontal conveyance device 6 which conveys one pallet P is shown, however, when the vehicle body B has a one-side two front and rear door structure, the number of pallets P to be conveyed while hung on the hanger 3 is also two, and accordingly, the horizontal conveyance device 6 is also provided in two left and right rows in the same structure. The pallet mounting bases 10A through 10C of the elevating conveyance device 7 shown in FIG. 12 and FIG. 13 are structured to have two pallet mounting portions 50 arranged in parallel so that two pallets P can be mounted thereon in parallel.

The pallet mounting bases 10A through 10C of the elevating conveyance device 7 include, as shown in FIG. 1, FIG. 10, FIG. 12, and FIG. 13, a left-to-right horizontal hanging shaft 51 common to the two pallet mounting portions 50, and the pallet mounting portion 50 is composed of a pair of left and right column supports 52a and 52b fixed to and suspended from the hanging shaft 51, a pair of left and right horizontal arm members 53a and 53b provided horizontally sideways continuously from lower ends of the column supports 52a and 52b, and a pair of left and right roller rails 54a and 54b consisting of a plurality of horizontal shaft rollers 54 pivotally supported at even intervals along the pallet transferring direction on the inner sides of the pair of left and right horizontal arm members 53a and 53b, and for the roller rails 54a and 54b, pallet guides 55a and 55b and pallet contact stoppers 56a and 56b in parallel to the pallet transferring direction are provided. The pallet mounting portion 50 includes a pallet latching means 57 provided at the lower end of a central column support 52c fixed to and suspended from the hanging shaft 51. The column supports 52b and 52a and the horizontal arm members 53b and 53a positioned on the adjacent side of the two left and right pallet mounting portions 50 are formed of one common column support and one common horizontal arm member, respectively, and the five column supports 52a through 52c fixed to and suspended from the hanging shaft 51 are integrated by a joint material 52d that joins the lower ends of these column supports to each other.

Figure 6:
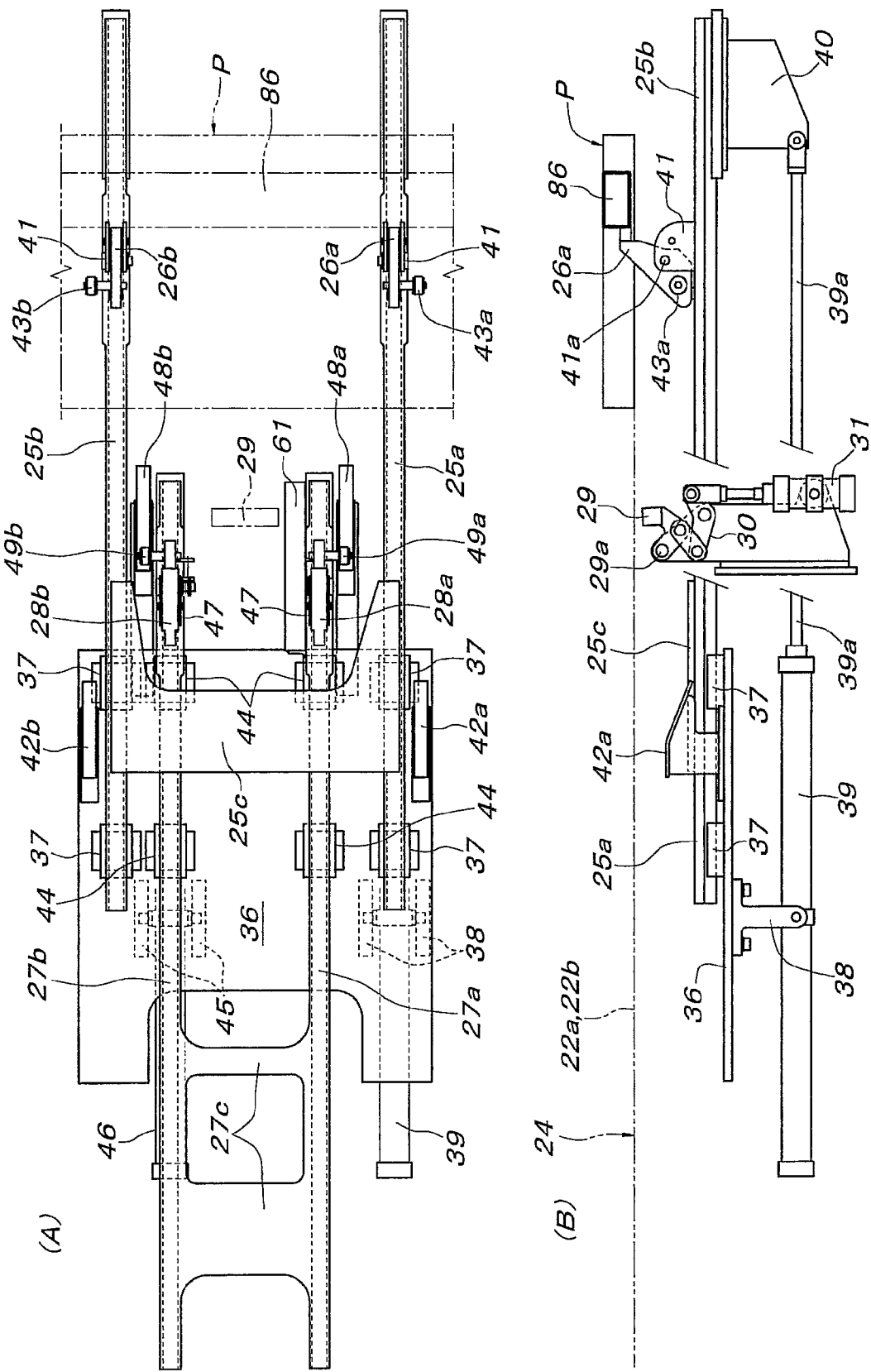
FIG. 6A is a plan view of a main portion of the pallet transferring means in a state in which the pallet is pushed out to an elevating conveyance device side.
FIG. 6B is a partially longitudinal sectional side view in the same state.
Figure 7:
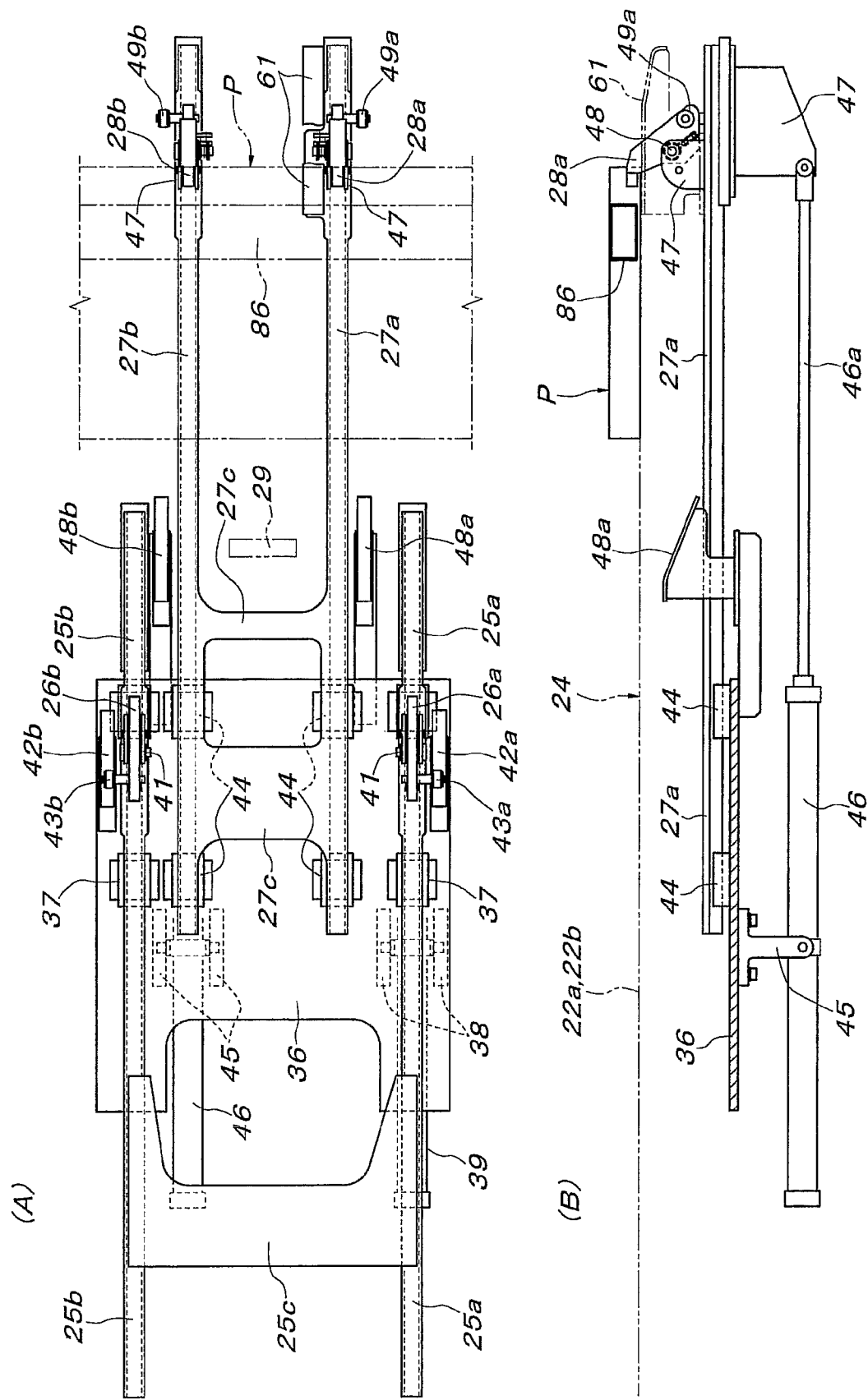
FIG. 7A is a plan view of the main portion of a pallet transferring means in a pallet drawing-in start state from the elevating conveyance device side.
FIG. 7B is a partially longitudinal sectional side view in the same state.
Figure 8:
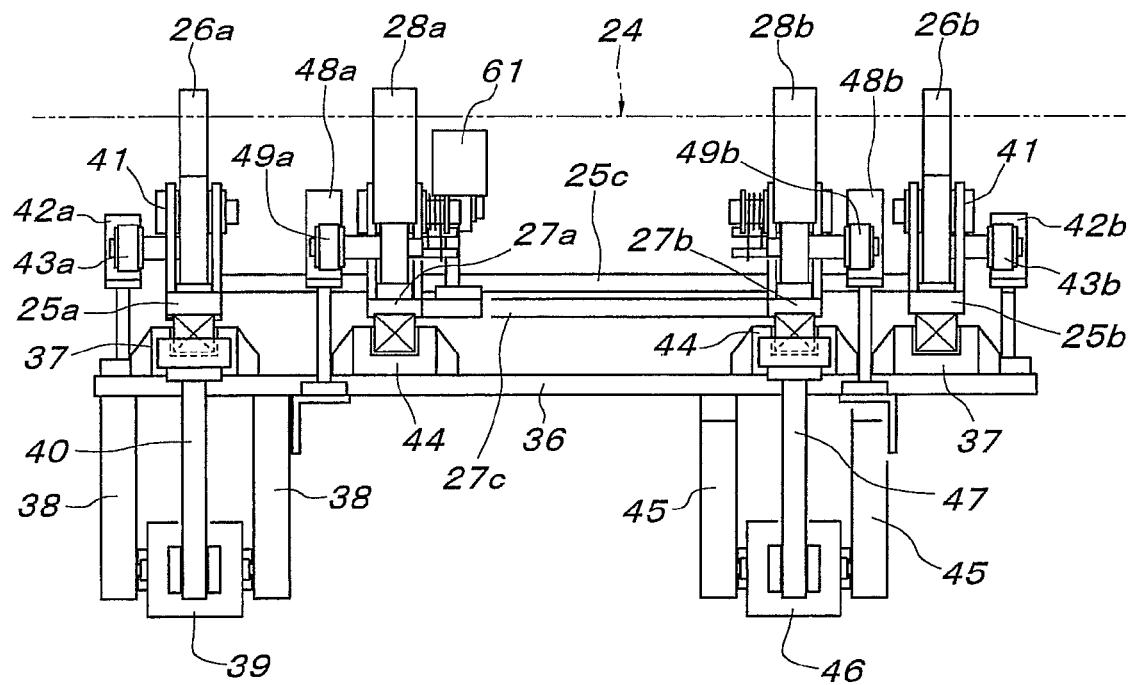
FIG. 8 is a front view of the main portion of the pallet transferring means.
Figure 9:
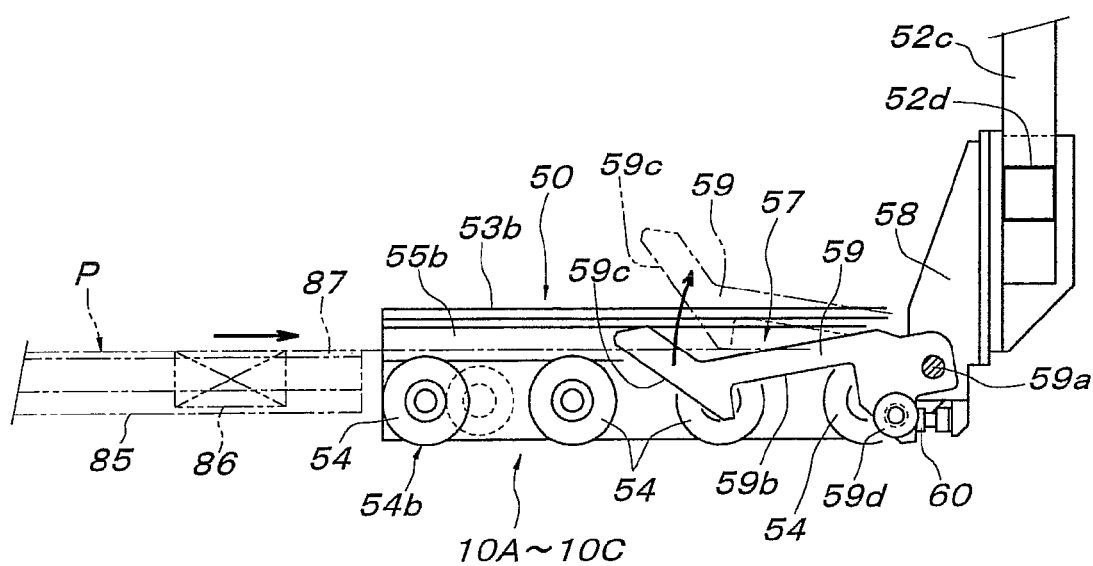
FIG. 9 is a longitudinal sectional side view showing a pallet latching means provided on a pallet mounting base of the elevating conveyance device.
Figure 11:
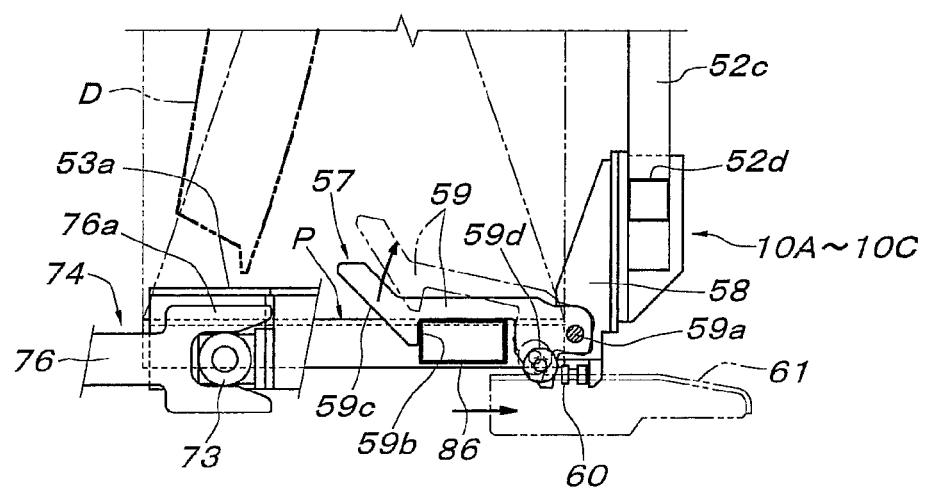
FIG. 11 is a longitudinal sectional side view showing a state in which the pallet is transferred onto the pallet mounting base of the elevating conveyance device.

The pallet latching means 57 includes, as shown in FIG. 9 and FIG. 11, a movable piece 59 pivotally supported on a bearing member 58 attached to the lower end of the central column support 52c by a pivot 59a so as to swing vertically, a stopper member 60 which receives the movable piece 59 that rotatively turns down due to gravity by the waiting posture shown in FIG. 9, a pallet fitting and latching concave portion 59b formed on the lower side of the movable piece 59, and an oblique operated side 59c formed at the tip end (free end) of the movable piece 59. To unlatch this latching means 57, as shown in FIG. 6 and FIG. 7, to one movable body 27b of the second movable bodies 27a and 27b of the pallet transferring means 9, an operating portion 61 formed of a cam plate which moves the movable piece 59 upward to an unlatching posture via the cam follower roller 59d pivotally supported on the base portion of the movable piece 59 when the second movable bodies 27a and 27b advance to the advancing limit position is attached at a side portion of the tip end of the movable body 27b.

The drive means 12 which rotatively moves vertically the pallet mounting bases 10A through 10C along the endless cyclic elevating path 11 includes, as shown in FIG. 1, FIG. 10, FIG. 12, and FIG. 13, a pair of left and right endless drive chains 64 wound around a pair of left and right lower wheels 62 and a pair of left and right upper wheels 63, a drive shaft 66 which is joined to and interlocked with the pair of left and right lower wheels 62 via interlocking chains 65, respectively, and a motor 67 which drives and rotates the drive shaft 66, and by joining two support members 68a and 68b which support positions near both ends of the hanging shaft 51 to the endless drive chains 64, the pallet mounting bases 10A through 10C are hung down so as to swing back and forth around the hanging shaft 51. Then, the endless cyclic elevating path 11 in which the pallet mounting bases 10A through 10C rotatively move vertically, a pair of left and right endless groove-shaped cam rails 69 and 70 are provided along the endless cyclic elevating path 11, and to each of the pallet mounting bases 10A through 10C, a cam follower lever 71 having, on its tip end, a roller 71a that fits one groove-shaped cam rail 69 is fixed to and provided diagonally downward continuously from one end of the hanging shaft 51, and a cam follower lever 72 having, on its tip end, a roller 72a that fits the other groove-shaped cam rail 70 is fixed to and provided diagonally upward continuously from one end of the hanging shaft 51.

According to the elevating conveyance device 7 constructed as described above, by rotating the pair of left and right endless drive chains 64 by operating the motor 67, the respective pallet mounting bases 10A through 10C rotatively move vertically along the endless cyclic elevating path 11, and at this time, rotation of the hanging shaft 51 of each of the pallet mounting bases 10A through 10C is blocked due to fitting of the roller 71a of the diagonally downward cam follower lever 71 fixed to the hanging shaft 51 to one cam rail 69 and fitting of the roller 72a of the diagonally upward cam follower lever 72 fixed to the hanging shaft 51 to the other cam rail 70, and the respective pallet mounting bases 10A through 10C rotatively move vertically along the endless cyclic elevating path 11 while the pallet mounting portions 50 are held in erect postures extending horizontally toward the side of the trolley conveyor line 1 and the carriage type floor conveyor line 4. In other words, the shapes of the pair of left and right endless cam rails 69 and 70 are determined so that the respective pallet mounting bases 10A through 10C rotatively move vertically along the endless cyclic elevating path 11 in this state.

Further, on each of the pallet mounting bases 10A through 10C, as shown in FIG. 10 through FIG. 14, engaged portions 73 formed of rollers pivotally supported on horizontal arm members 53a and 53b forming left and right sides of the pallet mounting portions 50 by a horizontal left-to-right shaft are provided, and on the horizontal conveyance device 6 side adjacent to the pallet transferring position P2, as shown in FIG. 4, pallet mounting base positioning means 74 are provided. The pallet mounting base positioning means 74 are provided corresponding to the respective engaged portions 73 of the pallet mounting bases 10A through 10C stopping at the pallet transferring position P2, and each includes a movable rod-shaped body 76 supported by a guide roller unit 75 so as to reciprocate in horizontal directions of moving away from an approaching the engaged portion 73 (pallet transferring direction), and a cylinder unit 77 which makes this movable rod-shaped body 76 to reciprocate, and at the tip end of the movable rod-shaped body 76, a U-shaped fitting portion 76a which blocks vertical movements of the pallet mounting bases 10A through 10C by fitting the engaged portion (roller) 73.

Figure 16:
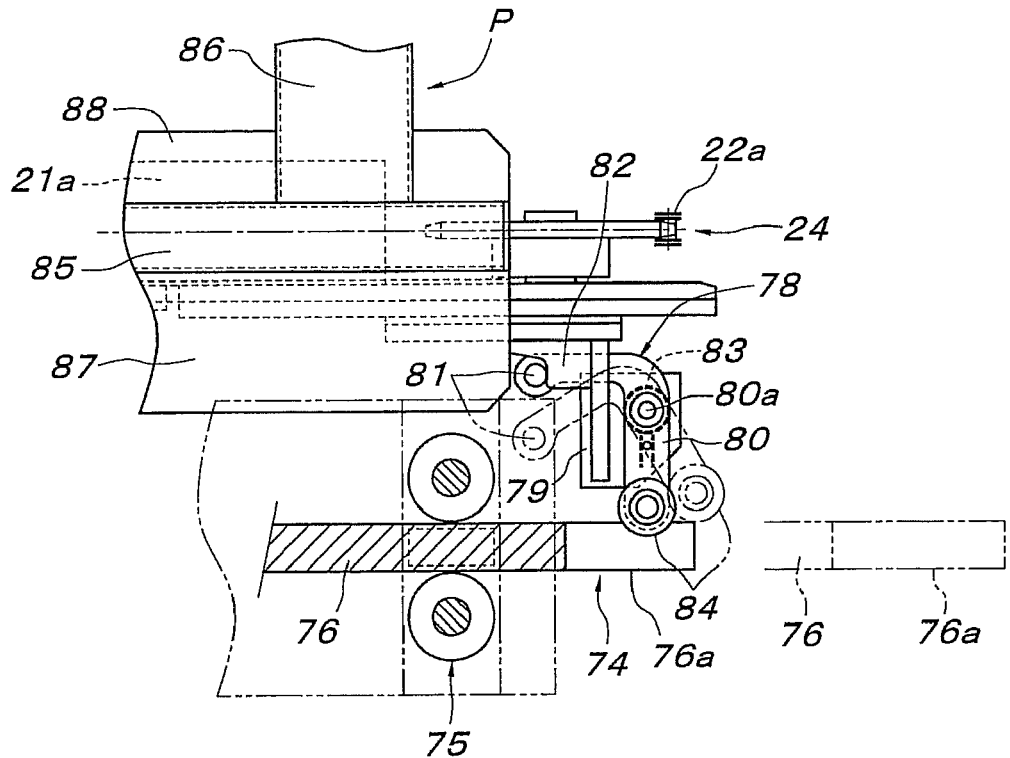
FIG. 16 is a partially cross-sectional plan view showing a third stopper portion provided on the pallet transferring means.
Figure 17:
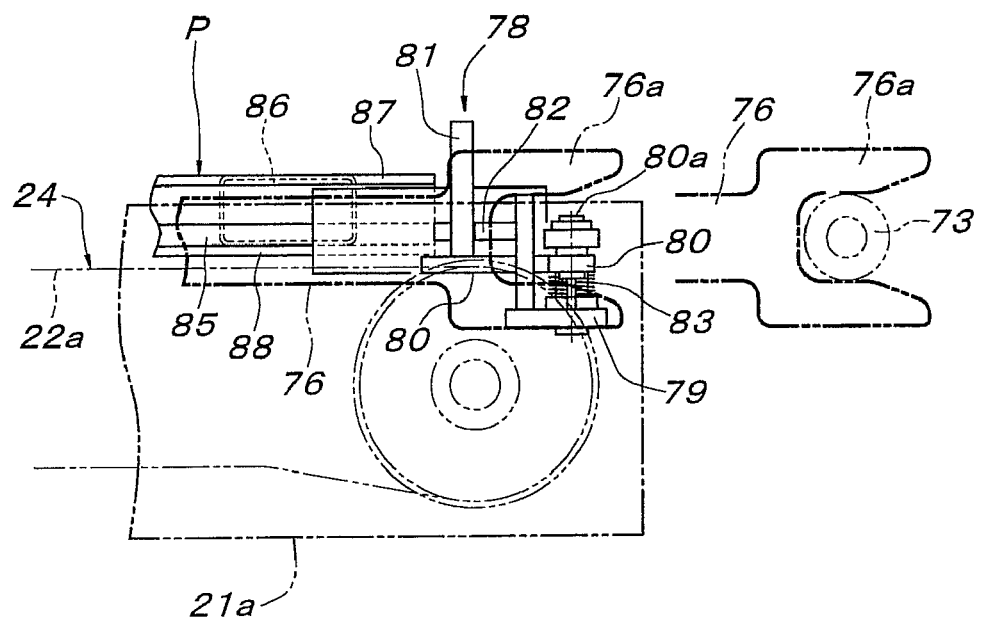
FIG. 17 is a side view showing the same third stopper portion.
Figure 18:
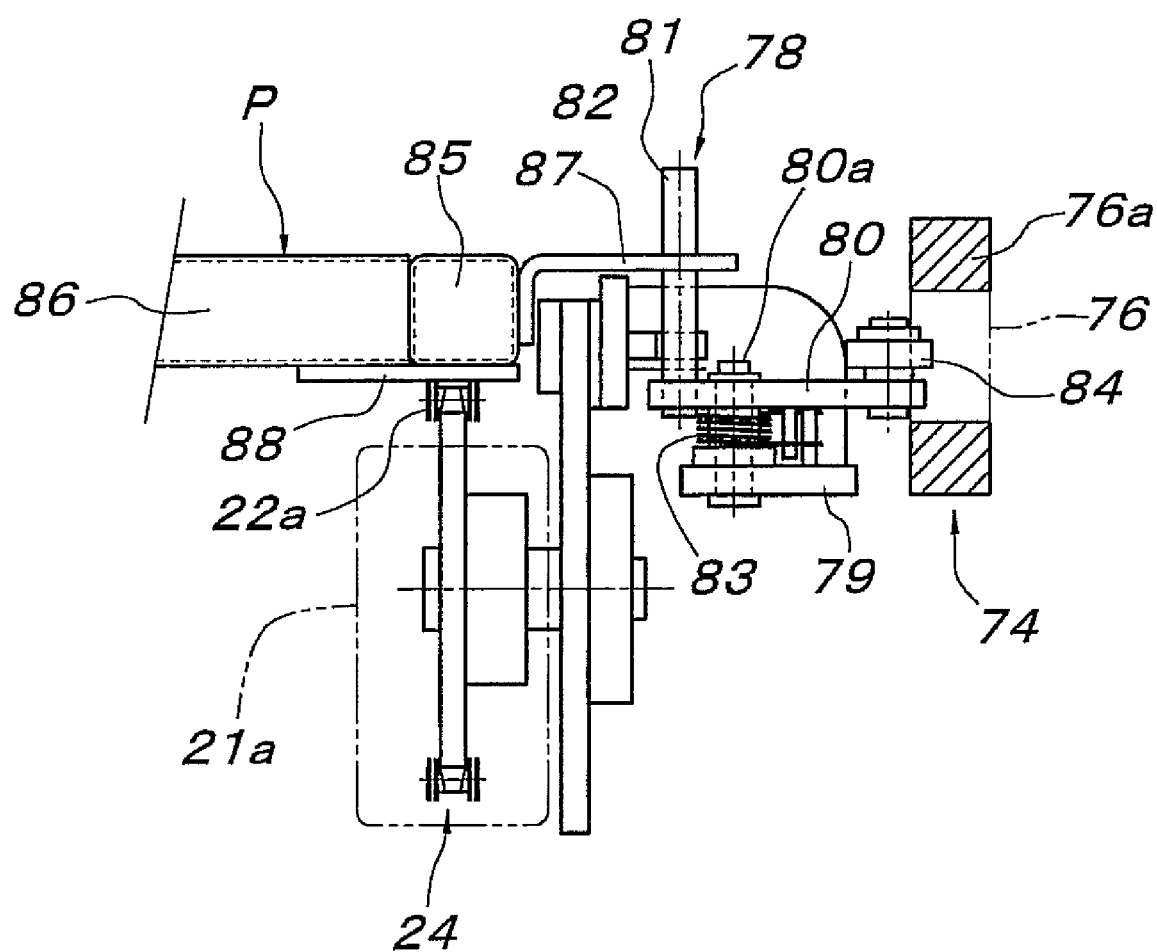
FIG. 18 is a partially longitudinal sectional back view showing the same third stopper portion.

For the respective pallet mounting base positioning means 74, a pair of left and right third stoppers 78 positioned on the ends of the pallet transferring position P2 side of the pallet carrying conveyor 24 in the pallet transferring means 9 constituting the horizontal conveyance device 6 are provided. The third stopper 78 is provided between the reciprocating path of the movable rod-shaped body 76 and the pallet carrying conveyor 24 as shown in FIG. 16 through FIG. 18, and includes a lever 80 in an L shape in a plan view pivotally supported near its bent portion onto a fixing support plate 79 by a vertical shaft 80a so as to swing horizontally, a stopper pin 81 stood vertically at the free end of one arm portion of the L-shaped lever 80, a stopper plate 82 which receives the stopper pin 81 in a state in which the stopper pin 81 is positioned at a slightly inner side rear of the vertical shaft 79, a twist spring 83 which urges and holds the L-shaped lever 80 at a stopper working position at which the stopper pin 81 comes into contact with the stopper plate 82, and an operated roller 84 pivotally supported by a vertical shaft at the free end of the other arm portion of the L-shaped lever 80 extending sideways to the outer side when the L-shaped lever 80 is at the stopper working position. As shown in FIG. 16, when the movable rod-shaped body 76 of the pallet mounting base positioning means 74 is at the retreating limit position, the operated roller 84 enters the U-shaped fitting portion 76a at the tip end of the movable rod-shaped body 76, whereby the L-shaped lever 80 can be turned to the stopper working position by an urging force of the twist spring 83. Therefore, when the movable rod-shaped body 76 advances, as shown by the imaginary lines in FIG. 16, the operated roller 84 is pushed out by the side surface of the movable rod-shaped body 76 and the L-shaped lever 80 rotates in a direction against the urging force of the twist spring 83 to switch the stopper pin 81 to a stop-releasing position.

Figure 14:
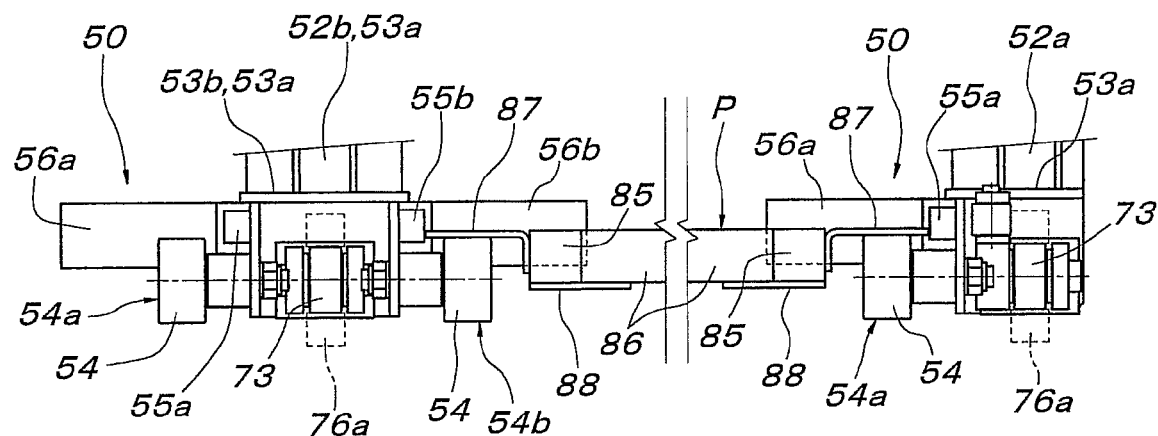
FIG. 14 is a front view of a main portion showing a state in which a pallet is supported on the pallet mounting base of the elevating conveyance device.
Figure 15:
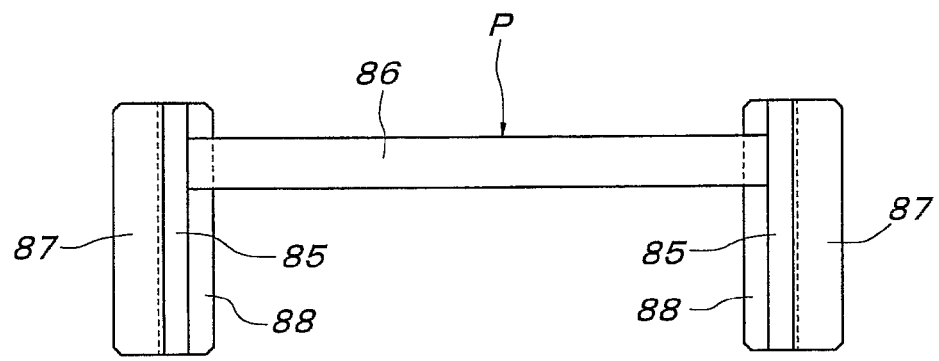
FIG. 15 is a plan view of a pallet.

The pallet P includes, as shown in FIG. 14 and FIG. 15, a pair of left and right side frames 85, a joint member 86 which joins both side frames 85 to each other at a position close to a rear end, a pair of left and right projecting plates 87 projecting outward from the upper sides of the left and right side frames 85, and a pair of left and right band-like bottom plates 88 which are laid over the bottom surfaces of the left and right side frames 85 and project to the side of the joint member 86, and to its upper side, a supporting attachment which suits the form of the door D to be handled is attached, however, this door attachment is omitted in the figures.

When this pallet P is mounted on the pallet mounting bases 10A through 10C of the elevating conveyance device 7, the pair of left and right projecting plates 87 are supported so as to slide back and forth in the pallet transferring direction by a pair of left and right roller rails 54a and 54b of the pallet mounting bases 10A through 10C. When the pallet P is conveyed by the pallet loading and unloading conveyor 8 of the horizontal conveyance device 6 or the pallet carrying conveyor 24 of the pallet transferring means 9, on the pairs of left and right roller chains 16a and 16b and 22a and 22b of the respective conveyors 8 and 24, a pair of left and right band-like bottom plates 88 are placed. The hanger 3 of the trolley conveyor line 1 supports the pallet P in a state in which the front and rear corners of the pair of left and right projecting plates 87 positioned at the four corners of the pallet P fit the pallet fitting supports 18. The pallet pushing-out engagement pieces 26a and 26b and the pallet drawing-in engagement pieces 28a and 28b of the pallet transferring means 9 engage with the joint member 86 of the pallet P and push and pull the pallet P. The first stopper 29 of the pallet transferring means 9 works on the joint member 86 of the pallet P, and the pairs of left and right second stoppers 32 and third stoppers 78 work on end sides in the front and rear direction (pallet transferring direction) of the pair of left and right projecting plates 87 of the pallet P. The pallet latching means 57 provided on the pallet mounting bases 10A through 10C of the elevating conveyance device 7 latch the pallet P on the pallet mounting portion 50 by fitting their pallet fitting and latching concave portions 59b of the movable pieces 59 to the joint member 86 of the pallet P from above as shown in FIG. 11.

In the conveyance device constricted as described above, procedures for assembling a door D conveyed on the hanger 3 of the trolley conveyor line 1 to a vehicle body B conveyed by the carriage type floor conveyor line 4 on the floor side are described, when the hanger 3 of the trolley conveyor line 1 stops at the hanger stop position P1, the pallet loading and unloading conveyor 8 of the horizontal conveyance device 6 is moved up parallel to the upper level shown in FIG. 3 from the lower level shown in FIG. 2 by operating the elevating drive cylinder units 14*a* and 14*b*, and the door-mounted pallet (hereinafter, referred to as occupied pallet) P supported by fitting the four corners to the fitting supports 18 of the hanger 3 is scooped up by the rear halves of the roller chains 16*a* and 16*b* that rise between the left and right support arms 19 of the hanger 3. At this time, the operating portions 35 on the front end of the pallet loading and unloading conveyor 8 switch the pair of left and right second stoppers 32 on the rear end of the pallet carrying conveyor 24 of the pallet transferring means 9 to the stop-releasing positions.

Next, the roller chains 16*a* and 16*b* of the pallet loading and unloading conveyor 8 and the roller chains 22*a* and 22*b* of the pallet carrying conveyor 24 are driven forward by the motors 17 and 23, respectively, an occupied pallet P lifted from the hanger 3 is conveyed from the position on the loading and unloading conveyor 8 onto the pallet carrying conveyor 24, and as shown in FIG. 5A, positioned at a predetermined position by the first stopper 29 that is at the stopping position as shown in FIG. 5A. At this time, as shown in FIG. 5A, the pallet pushing-out engagement pieces 26*a* and 26*b* of the pallet transferring means 9 are at retreating waiting positions at the rear side of the occupied pallet conveying direction more than the joint member 86 of the occupied pallet P positioned by the first stopper 29, however, they are switched into fall-down postures by the cam rails 42*a* and 42*b*, and the pallet drawing-in engagement pieces 28*a* and 28*b* of the pallet transferring means 9 are at retreating waiting positions just below the joint member 86 of the occupied pallet P positioned by the first stopper 29, as shown in FIG. 5B, however, they are switched into fall-down postures by the cam rails 48*a* and 48*b*, so that the occupied pallet P is smoothly conveyed to a stop position positioned by the first stopper 29.

Figure 10:
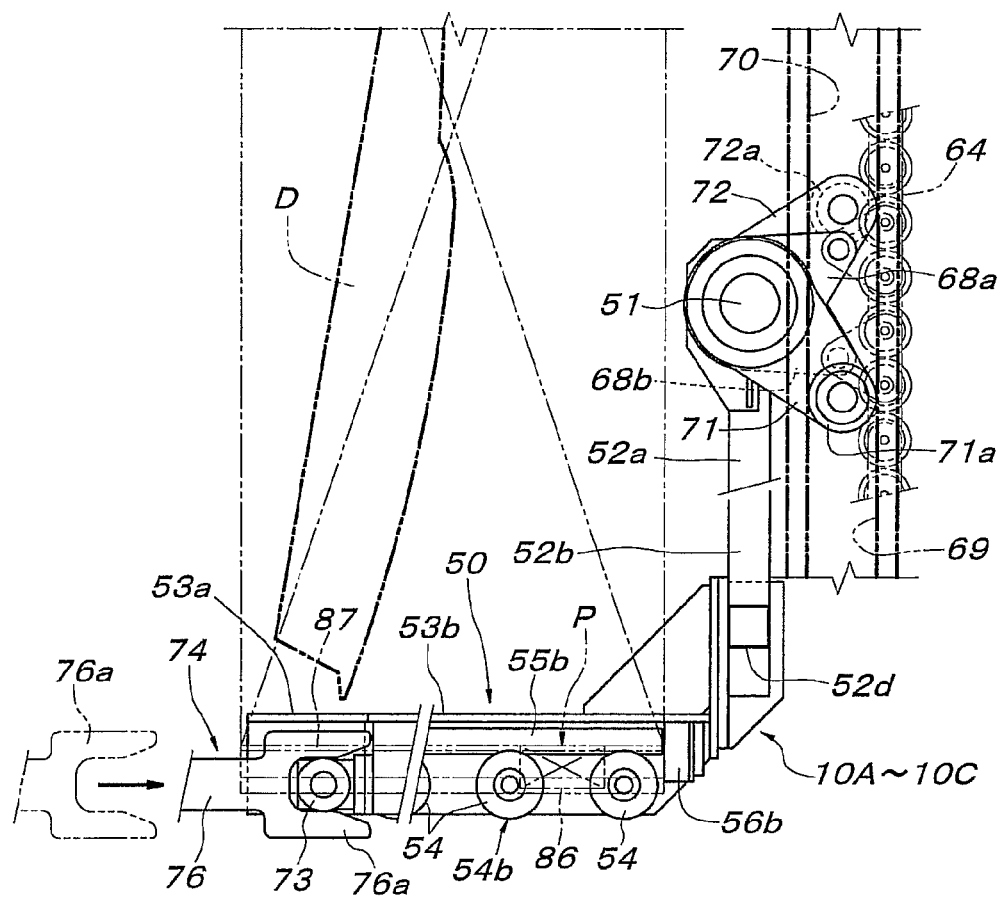
FIG. 10 is a side view showing a hanging structure of the pallet mounting base of the elevating conveyance device and a pallet mounting base positioning structure.

On the other hand, as shown in FIG. 1, in the elevating conveyance device 7, in a state in which the endless drive chain 64 of the drive means 12 stops, two of the three pallet mounting bases 10A through 10C stop at the pallet transferring position P2 and the door loading and unloading position P3. Therefore, for example, in a situation that the pallet mounting base 10A stops and waits at the pallet transferring position P2, the pair of left and right pallet mounting base positioning means 74 shown in FIG. 4 are actuated. That is, the movable rod-shaped bodies 76 are advanced from the retreating limit position to the advancing limit position by the cylinder units 77, and the U-shaped fitting portions 76*a* at the tip ends thereof are fitted to the pair of left and right engaged portions (rollers) 73 of the pallet mounting base 10A that is stopped and waits at the pallet transferring position P2 as shown in FIG. 10 and FIG. 11, and the vertical position of the pallet mounting base 10A is fixed. By the advance of the movable rod-shaped bodies 76 at this time, the stopper pins 81 of the third stoppers 78 switched to the stopping positions by the movable rod-shaped bodies 76 as shown by the solid lines in FIG. 16 automatically return to the stop-releasing positions (positions separated to the side of the moving path of the pallet P) due to urging forces of the twist springs 83, so that it becomes possible that the pallet P can be sent out to the pallet transferring position P2 of the elevating conveyance device 7 from the pallet carrying conveyor 24.

At the time when the above-described pallet transferring preparation is completed, the pallet pushing-out engagement pieces 26*a* and 26*b* of the pallet transferring means 9 are actuated. That is, as shown in FIG. 6, in a state in which the first stopper 29 is made to fall down to the stop-releasing position by the cylinder unit 31, the pair of left and right first movable bodies 25*a* and 25*b* are advanced toward the pallet transferring position P2 by the cylinder unit 39. Then, the pallet pushing-out engagement pieces 26*a* and 26*b* separated forward from the cam rails 42*a* and 42*b* push out the occupied pallet P that automatically rose according to an urging force and is stopped and waits on the pallet carrying conveyor 24 onto the pallet mounting portion 50 of the pallet mounting base 10A stopped and waits at the pallet transferring position P2 by pushing two left and right points of the joint member 86.

The occupied pallet P transferred onto the pallet mounting portion 50 of the pallet mounting base 10A slides on the pair of left and light roller rails 54*a* and 54*b* while its projecting plates 87 on both left and right sides are restricted in position between the pallet guides 55*a* and 55*b* on the pallet mounting base 10A side, and is sent to a position at which two left and right points on the front end of this occupied pallet P come into contact with the pallet contact stoppers 56*a* and 56*b* as shown by the imaginary lines of FIG. 10 and FIG. 14. At this time, the joint member 86 of the occupied pallet P passes through the position of the movable piece 59 of the pallet latching means 57 on the pallet mounting base 10A side while pushing-up the movable piece 59 against gravity by using the operated side 59*c* as shown by the imaginary lines in FIG. 9, and when the occupied pallet P reaches the position in contact with the pallet contact stoppers 56*a* and 56*b*, as shown in FIG. 11, the pallet fitting and latching concave portion 59*b* of the movable piece 59 that lowers and returns due to gravity fits the joint member 86 of the occupied pallet P from above to fix the occupied pallet P onto the pallet mounting portion 50.

After the occupied pallet P is completely transferred onto the pallet mounting base 10A of the elevating conveyance device 7, the movable rod-shaped bodies 76 of the pallet mounting base positioning means 74 are returned to the retreating limit position shown in FIG. 16 through FIG. 18 by the cylinder units 77, and the U-shaped fitting portions 76*a* at the tip ends thereof are spaced from the engaged portions 73 on the pallet mounting base 10A side, and the stopper pins 81 of the third stoppers 78 are returned to the original stopping positions.

Thereafter, the motor 67 of the drive means 12 of the elevating conveyance device 7 is worked, and the pair of left and right endless drive chains 64 are rotated by a unit pitch length between the pallet mounting bases 10A through 10C so as to lower the occupied pallet P at the pallet transferring position P2 directly downward on the front side elevating path of the endless cyclic elevating path 11. At this time, all pallet mounting bases 10A through 10C rotate while being held in erect postures in which the pallet mounting portions 50 (horizontal arm members 53*a* and 53*b*) are horizontally cantilevered and extended to the side of the trolley conveyor line 1 and the carriage floor conveyor line 4. As a result, the pallet mounting base 10A onto which the occupied pallet P was transferred at the pallet transferring position P2 arrives and stops at the door loading and unloading position P3 just below. At this time, the pallet mounting base 10C that is stopped and waits on the rear side elevating path of the endless cyclic elevating path 11 arrives at the pallet transferring position P2 and stops there, and the pallet mounting base 10B that had been at the door loading and unloading position P3 stops and waits at a waiting position in the middle of the rear elevating path of the endless cyclic elevating path 11.

When the pallet mounting base 10A onto which the occupied pallet P was transferred arrives at the door loading and unloading position P3 and stops there, an operator picks up the vehicle door D from the pallet P on the pallet mounting base 10A and can assemble it to the vehicle body B mounted on the carriage 5 of the carriage type floor conveyor line 4.

Accordingly, on the pallet mounting base 10A at the door loading and unloading position P3, the empty pallet P is mounted.

By repeating the conveyance cycle of the occupied pallet P according to the above-described procedures, in the cycle for conveying the occupied pallet P from the pallet transferring position P2 to the door loading and unloading position P3, the pallet mounting base 10A on which an empty pallet P was mounted on and had been stopped and was waiting on the rear side elevating path of the endless cyclic elevating path 11 arrives at the pallet transferring position P2 and stops there, so that at this time, the empty hanger 3 of the trolley conveyor line 1 that conveyed the occupied pallet P transferred onto the pallet mounting base 10C at the pallet transferring position P2 is made to wait as it is at the hanger stop position P1, the pallet loading and unloading conveyor 8 is also made to stop and wait at the upper level, and the first stopper 29 is also left switched to the stop-releasing position, and in this state, a next empty pallet return cycle is performed.

That is, as shown in FIG. 5A, the first movable bodies 25a and 25b are retreated by the cylinder units 39, the pallet pushing-out engagement pieces 26a and 26b are returned to the original retreating limit position and switched into fall-down postures by the cam rails 42a and 42b. Then, as shown in FIG. 11, by actuating the pallet mounting base positioning means 74, the vertical position of the pallet mounting base 10A arriving and stopping at the pallet transferring position P2 is fixed, and as shown by the imaginary lines in FIG. 16, the stopper pins 81 of the third stoppers 78 are returned to the stop-releasing positions. In this state, the second movable bodies 27a and 27b of the pallet transferring means 9 are advanced to the advancing limit position shown in FIG. 7 from the retreating limit position shown in FIG. 5B by the cylinder units 46. Then, the pallet drawing-in engagement pieces 28a and 28b on the second movable bodies 27a and 27b are separated forward from the cam rails 48a and 48b, and move to the pallet transferring position P2 side in a state in which they are automatically restored into the rising postures by an urging force.

The pallet drawing-in engagement pieces 28a and 28b are made to fall down against the urging force by the joint member 86 of the empty pallet P when passing under the empty pallet P on the pallet mounting base 10A stopping at the pallet transferring position P2, and as shown in FIG. 7, reach and stop at the advancing limit position in a state in which they are restored into rising postures by urging forces again after completely passing through the position of the joint member 86. At this time, the operating portion 61 attached to the tip end side of the second movable body 27a pushes up the cam follower roller 59d of the movable piece 59 as shown by the imaginary lines in FIG. 11, whereby the pallet latching means 57 (latching piece 59) is switched into an unlatch state against gravity, so that the pallet fitting and latching concave portion 59b of the movable piece 59 separates upward from the joint member 86 of the empty pallet P, and the fixation of the empty pallet P to the pallet mounting base 10A is automatically released.

Next, the second movable bodies 27a and 27b reaching the advancing limit position are retreated to the retreating limit position shown in FIG. 5B by the cylinder unit 46. As a result, the empty pallet P on the pallet mounting base 10A at the pallet transferring position P2 is conveyed onto the pallet carrying conveyor 24 on the pallet transferring means 9 side from the pallet mounting base 10A according to drawing-in of two left and right points of the joint member 86 by the pallet drawing-in engagement pieces 28a and 28b on the second movable bodes 27a and 27b. At this time, as shown by the imaginary lines in FIG. 16, the stopper pin 81 of the third stopper 78 is switched to the stop-releasing position by the side of the pallet moving path, the first stopper 29 is switched into the fall-down posture shown in FIG. 6, and the pallet pushing-out engagement pieces 26a and 26b are switched into the fall-down postures shown in FIG. 5A, so that these do not interfere with the empty pallet P that is drawn onto the pallet carrying conveyor 24 from the pallet transferring position P2.

The drawing of the empty pallet P by the pallet drawing-in engagement pieces 28a and 28b is ended when reaching the retreating limit position at which the pallet drawing-in engagement pieces 28a and 28b are switched into the fall-down postures by the cam rails 48a and 48b, and at this time, the entirety of the empty pallet P has been transferred onto the pair of left and right roller chains 22a and 22b of the pallet carrying conveyor 24. Therefore, after this or at an appropriate time after the drawing of the empty pallet P by the pallet drawing-in engagement pieces 28a and 28b starts, the roller chains 22a and 22b of the pallet carrying conveyor 24 and the roller chains 16a and 16b of the pallet loading and unloading conveyor 8 which are connected to the roller chains 22a and 22b at the same level and are positioned at the upper level are driven in reverse by the motors 23 and 17, whereby the empty pallet P on the pallet carrying conveyor 24 can be conveyed by the conveyors 24 and 8 to the position just above the empty hanger 3 that stops and waits at the hanger stop position P1 of the trolley conveyor line 1. Thereafter, by lowering the pallet loading and unloading conveyor 8 to the lower level shown in FIG. 2 from the upper level shown in FIG. 3, the empty pallet P on the pallet loading and unloading conveyor 8 can be lowered and transferred by fitting the four corners of the empty pallet P to the pallet fitting supports 18 on the support arms 19 of the empty hanger 3 stops and waits at the hanger stop position P1.

As understood from the description given above, according to the conveyance device of the present invention, by operations of the elevating conveyance device 7 when an occupied pallet P which a door D is mounted on and was put down from the hanger 2 of the trolley conveyor line 1 is transferred from the horizontal conveyance device 6 onto the elevating conveyance device 7 and conveyed to the door loading and unloading position P3, an empty pallet P from which the door was previously unloaded at the door loading and unloading position P3 can be simultaneously conveyed to the pallet transferring position P2, and this empty pallet P can be transferred from the elevating conveyance device 7 to the horizontal conveyance device 6 and loaded onto the empty hanger 3 of the trolley conveyor line 1 which the occupied pallet P was unloaded from and is waiting at the hanger stop position P1.

As a matter of course, by operating the conveyance device according to procedures reverse to the above-described procedures, the door D detached from a vehicle body B on the carriage type floor conveyor line 4 can be conveyed to the trolley conveyor line 1 from the door loading and unloading position P3 on the floor side. In this case, an empty pallet P is conveyed to the hanger stop position P1 by the hanger 3 of the trolley conveyor line 1, and by operations of the elevating conveyance device 7 when an empty pallet P put down from the hanger 3 at the hanger stop position P1 is transferred from the horizontal conveyance device 6 to the elevating conveyance device 7 and conveyed to the door loading and unloading position P3, the occupied pallet P on which a door D was previously loaded at the door loading and unloading position P3 can be simultaneously conveyed to the pallet transferring position P2, and this occupied pallet P can be transferred from the elevating conveyance device 7 to the horizontal conveyance device 6 and loaded on the hanger 3 of the trolley conveyor line 1 in which the empty pallet P was unloaded from and is waiting at the hanger stop position P1.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A method of conveying objects to an object loading and unloaded position, comprising:

providing an object loading and unloading conveyance device operable to convey an object together with a pallet supporting the object between a hanging conveyance line, in which the pallet and object are conveyed while being supported by a hanging hanger, and the object loading and unloading position below the hanging conveyance line, providing the object loading and unloading conveyance device with a horizontal conveyance device operable to convey the pallet horizontally between a hanger stop position in the hanging conveyance line and a pallet transferring position above the object loading and unloading position, providing the object loading and unloading conveyance device with an elevating conveyance device operable to convey the pallet between the pallet transferring position and the object loading and unloading position, providing the elevating conveyance device with a plurality of pallet mounting bases for supporting pallets and an endless cyclic elevating path operable to move the pallet mounting bases cyclically vertically, and with means for driving the pallet mounting bases operable to rotatively move the pallet mounting bases while holding the pallet mounting bases in erect postures in the endless cyclic elevating path, providing the pallet mounting bases at even intervals equal to a distance between the pallet transferring position and the object loading and unloading position, and providing the pallet transferring position and the object loading and unloading position on a same side of the endless cyclic elevating path of the elevating conveyance device so that when a pallet mounting base is moved to the object loading and unloading position, another pallet mounting base is simultaneously moved to the pallet transferring position, providing a first object supported by a first pallet on a first pallet mounting base of the elevating conveyance device, the first pallet mounting base being positioned at the pallet transferring position;

providing an empty pallet on a second pallet mounting base of the elevating conveyance device, the empty pallet being from an object that was previously unloaded;

cyclically operating the elevating conveyance device along the endless cyclic elevating path to simultaneously move (a) the first pallet mounting base carrying the first object on the first pallet to the object loading and unloading position, and (b) the second pallet mounting base carrying the empty pallet to the pallet transferring position, and after the cyclical operation the elevating conveyance device and without further cyclical operation thereof, removing the empty pallet from the second pallet mounting base, transferring the empty pallet to the hanging conveyance line, and transferring a second object on a second pallet from the hanging conveyance line to the second pallet mounting base.

2. The method of claim 1, wherein the number of pallet mounting bases provided in the endless cyclic elevating path of the elevating conveyance device is three.

3. The method of claim 1, wherein on each of the pallet mounting bases of the elevating conveyance device, a pair of roller rails which support left and right sides of the pallet movably horizontally are provided.

4. The method of claim 3, wherein the pallet is structured so as to include a pair of left and right side frames, a joint member which joins the side frames to each other, and a pair of left and right projecting plates projecting outward from the upper sides of the left and right side frames, and the pair of left and right projecting plates are supported by the pair of left and right roller rails.

5. The method of claim 1, wherein the horizontal conveyance device is provided with means for positioning the pallet mounting bases which engages with and disengages from engaged portions of the pallet mounting bases stopping at the pallet transferring position, and can hold the pallet mounting bases at a fixed stop level by engaging with the engaged portions.

6. The method of claim 5, wherein the horizontal conveyance device is provided with stoppers for preventing dropping of the pallet to the pallet transferring position side from the position on the horizontal conveyance device, the stoppers are urged and held at stopping positions, and the pallet mounting base positioning means is provided with a movable rod-like body which has, on its tip end, a fitting portion that can engage with and disengage from the engaged portion, and is movable in directions of moving away from and approaching the engaged portion, and a lever which is operated by the movable rod-like body when this movable rod-like body advances is provided on the stopper, and when the movable rod-like bodies advance and the fitting portions on the tip ends fit the engaged portions, the stoppers are switched to stop-releasing positions via the levers.

7. The method of claim 1, wherein the hanging hanger of the hanging conveyance line is structured to include a pallet fitting support which supports the pallet so as to fit and separate vertically, and the horizontal conveyance device can include a pallet loading and unloading conveyor which loads and unloads the pallet onto and from the hanger according to elevating and lowering movements with respect to the hanger stopping at the hanger stop position, and means for transferring the pallet which transfers the pallet between the pallet loading and unloading conveyor and the pallet mounting bases stopping at the pallet transferring position.

8. The method of claim 7, wherein the pallet transferring means of the horizontal conveyance device includes a pallet carrying conveyor, a first movable body, and a second movable body, wherein the pallet carrying conveyor is connected to the pallet loading and unloading conveyor above the hanger stopping at the hanger stop position, the first movable body is constructed to reciprocate in the pallet conveying direction, and on the first movable body, a pallet pushing-out engagement piece is provided which propels the pallet onto the pallet mounting bases stopping at the pallet transferring position from the pallet carrying conveyor, and the second movable body moves to reciprocate in the pallet conveying direction, and on the second movable body, a pallet drawing-in engagement piece can be provided which propels the pallet from the position on the pallet mounting bases stopping at the pallet transferring position onto the pallet carrying conveyor.

9. The method of claim 8, wherein on the pallet mounting bases, means for latching the pallet which automatically engages with the pallet transferred onto the corresponding pallet mounting base by the pallet pushing-out engagement piece to prevent the pallet from retreating is provided, and on the second movable body, an operating portion can be provided which switches the pallet latching means into an unlatching posture according to advancing thereof to the side of the pallet mounting base.

10. The method of claim 8, wherein the pallet carrying conveyor of the pallet transferring means is provided with stoppers for preventing dropping of the pallet to the pallet loading and unloading conveyor side from the position on this conveyor, and the stoppers are urged and held at stopping positions, and the pallet loading and unloading conveyor can be provided with operating portions which switch the stoppers to the releasing positions against the urging forces when the pallet loading and unloading conveyor rises to a position above the hanger stopping at the hanger stop position and is connected to the pallet carrying conveyor.

11. A method of conveying objects from an object loading and unloaded position, comprising:
providing an object loading and unloading conveyance device operable to convey an object together with a pallet supporting the object between a hanging conveyance line, in which the pallet and object are conveyed while being supported by a hanging hanger, and the object loading and unloading position below the hanging conveyance line,
providing the object loading and unloading conveyance device with a horizontal conveyance device operable to convey the pallet horizontally between a hanger stop position in the hanging conveyance line and a pallet transferring position above the object loading and unloading position,
providing the object loading and unloading conveyance device with an elevating conveyance device operable to convey the pallet between the pallet transferring position and the object loading and unloading position,
providing the elevating conveyance device with a plurality of pallet mounting bases for supporting pallets and an endless cyclic elevating path operable to move the pallet mounting bases cyclically vertically, and with means for driving the pallet mounting bases operable to rotatively move the pallet mounting bases while holding the pallet mounting bases in erect postures in the endless cyclic elevating path,
providing the pallet mounting bases at even intervals equal to a distance between the pallet transferring position and the object loading and unloading position, and providing the pallet transferring position and the object loading and unloading position on a same side of the endless cyclic elevating path of the elevating conveyance device so that when a pallet mounting base is moved to the object loading and unloading position, another pallet mounting base is simultaneously moved to the pallet transferring position,
providing a first object supported by a first pallet on a first pallet mounting base of the elevating conveyance device, the first pallet mounting base being positioned at the object loading and unloading position;
providing an empty pallet on a second pallet mounting base of the elevating conveyance device, the empty pallet being from an object that was previously unloaded;
cyclically operating the elevating conveyance device along the endless cyclic elevating path to simultaneously move
(a) the first pallet mounting base carrying the first object on the first pallet to the pallet transferring position, and
(b) the second pallet mounting base carrying the empty pallet to the object loading and unloading position, and
after the cyclical operation the elevating conveyance device and without further cyclical operation thereof, transferring the first object on the first pallet to the hanging conveyance line and transferring an empty pallet from the hanging conveyance line to the first pallet mounting base.

12. The method of claim 11, wherein the number of pallet mounting bases provided in the endless cyclic elevating path of the elevating conveyance device is three.

13. The method of claim 11, wherein on each of the pallet mounting bases of the elevating conveyance device, a pair of roller rails which support left and right sides of the pallet movably horizontally are provided.

14. The method of claim 13, wherein the pallet is structured so as to include a pair of left and right side frames, a joint member which joins the side frames to each other, and a pair of left and right projecting plates projecting outward from the upper sides of the left and right side frames, and the pair of left and right projecting plates are supported by the pair of left and right roller rails.

15. The method of claim 11, wherein the horizontal conveyance device is provided with means for positioning the pallet mounting bases which engages with and disengages from engaged portions of the pallet mounting bases stopping at the pallet transferring position, and can hold the pallet mounting bases at a fixed stop level by engaging with the engaged portions.

16. The method of claim 15, wherein the horizontal conveyance device is provided with stoppers for preventing dropping of the pallet to the pallet transferring position side from the position on the horizontal conveyance device, the stoppers are urged and held at stopping positions, and the pallet mounting base positioning means is provided with a movable rod-like body which has, on its tip end, a fitting portion that can engage with and disengage from the engaged portion, and is movable in directions of moving away from and approaching the engaged portion, and a lever which is operated by the movable rod-like body when this movable rod-like body advances is provided on the stopper, and when the movable rod-like bodies advance and the fitting portions on the tip ends fit the engaged portions, the stoppers are switched to stop-releasing positions via the levers.

17. The method of claim 11, wherein the hanging hanger of the hanging conveyance line is structured to include a pallet fitting support which supports the pallet so as to fit and separate vertically, and the horizontal conveyance device can include a pallet loading and unloading conveyor which loads and unloads the pallet onto and from the hanger according to elevating and lowering movements with respect to the hanger stopping at the hanger stop position, and means for transferring the pallet which transfers the pallet between the pallet loading and unloading conveyor and the pallet mounting bases stopping at the pallet transferring position.

18. The method of claim 17, wherein the pallet transferring means of the horizontal conveyance device includes a pallet carrying conveyor, a first movable body, and a second movable body, wherein the pallet carrying conveyor is connected to the pallet loading and unloading conveyor above the hanger stopping at the hanger stop position, the first movable body is constructed to reciprocate in the pallet conveying direction, and on the first movable body, a pallet pushing-out engagement piece is provided which propels the pallet onto the pallet mounting bases stopping at the pallet transferring position from the pallet carrying conveyor, and the second movable body moves to reciprocate in the pallet conveying direction, and on the second movable body, a pallet drawing-in engagement piece can be provided which propels the pallet from the position on the pallet mounting bases stopping at the pallet transferring position onto the pallet carrying conveyor.

19. The method of claim 18, wherein on the pallet mounting bases, means for latching the pallet which automatically engages with the pallet transferred onto the corresponding pallet mounting base by the pallet pushing-out engagement piece to prevent the pallet from retreating is provided, and on the second movable body, an operating portion can be provided which switches the pallet latching means into an unlatching posture according to advancing thereof to the side of the pallet mounting base.

20. The method of claim 18, wherein the pallet carrying conveyor of the pallet transferring means is provided with stoppers for preventing dropping of the pallet to the pallet loading and unloading conveyor side from the position on this conveyor, and the stoppers are urged and held at stopping positions, and the pallet loading and unloading conveyor can be provided with operating portions which switch the stoppers to the releasing positions against the urging forces when the pallet loading and unloading conveyor rises to a position above the hanger stopping at the hanger stop position and is connected to the pallet carrying conveyor.

* * * * *